US006612426B1

(12) United States Patent
Guerra et al.

(10) Patent No.: US 6,612,426 B1
(45) Date of Patent: Sep. 2, 2003

(54) CONVEYOR BELT ASSEMBLY

(75) Inventors: Ignacio Muñoz Guerra, Miramar, PR (US); Ariel Caraballo, Cidra, PR (US); Francisco Rosario, Bayamón, PR (US); Carmelo Arroyo, Canóvanas, PR (US); Geovanny Lopez, Dorado, PR (US)

(73) Assignee: Autopak Engineering Corporation, San Juan, PR (US)

( * ) Notice: Subject to any disclaimer, the term of this patent is extended or adjusted under 35 U.S.C. 154(b) by 74 days.

(21) Appl. No.: 09/695,344

(22) Filed: Oct. 24, 2000

(51) Int. Cl.[7] .............................................. B65G 21/06
(52) U.S. Cl. .................................... 198/860.2; 198/941
(58) Field of Search .......................... 198/860.1, 860.2, 198/861.1, 850, 831, 841

(56) References Cited

U.S. PATENT DOCUMENTS

| | | | |
|---|---|---|---|
| 3,596,752 A | * | 8/1971 | Garvey ........................ 198/637 |
| 3,835,982 A | * | 9/1974 | Zappia ........................ 198/570 |
| 3,881,594 A | * | 5/1975 | Jepsen ........................ 198/583 |
| 3,944,054 A | * | 3/1976 | Ensinger ..................... 198/835 |
| 3,993,185 A | | 11/1976 | Fleckenstein et al. |
| 4,269,302 A | | 5/1981 | Garvey |
| 4,276,980 A | | 7/1981 | Oizumi |
| 4,438,838 A | | 3/1984 | Hodlewsky et al. |
| D282,907 S | | 3/1986 | Schroeder et al. |
| D284,640 S | | 7/1986 | Schroeder et al. |
| 4,597,492 A | | 7/1986 | Lachonius et al. |
| D289,496 S | | 4/1987 | Schroeder et al. |
| 4,674,627 A | | 6/1987 | Dussan v. Benicio I. |
| D290,932 S | | 7/1987 | Abbestam et al. |
| 4,727,981 A | * | 3/1988 | Johansson ................... 198/841 |
| 4,733,771 A | * | 3/1988 | Grundken et al. ....... 198/735.6 |
| 4,821,866 A | | 4/1989 | Melgaard |
| 4,951,809 A | * | 8/1990 | Boothe et al. .............. 198/841 |
| 4,953,693 A | | 9/1990 | Draebel |
| 4,961,492 A | | 10/1990 | Wiseman et al. |
| 4,967,897 A | | 11/1990 | Lachonius et al. |
| 4,982,835 A | | 1/1991 | Butler et al. |
| 5,027,944 A | | 7/1991 | Damkjaer |
| 5,029,697 A | | 7/1991 | McMillan et al. |
| 5,031,757 A | | 7/1991 | Draebel et al. |
| 5,082,108 A | | 1/1992 | Douglas |
| 5,178,263 A | * | 1/1993 | Kempen ................... 198/836.1 |
| 5,186,314 A | * | 2/1993 | Clopton ...................... 198/841 |
| 5,188,210 A | | 2/1993 | Malow |
| 5,303,817 A | | 4/1994 | Kissee |

(List continued on next page.)

OTHER PUBLICATIONS

FLEX–LINK—Drawing—Free Chain Beam #3927261–Jun. 25, 1996.
FLEX–LINK—Drawing—Locked Chain Beam #3927262—Jun. 25, 1996.
FLEX–LINK—Drawing—Return Beam—#3927263—Jun. 25, 1996.
FLEX LINK—Drawing—Top Beam#3927264—Jun. 25, 1996.
FLEX LINK—Drawing—Top Beam SR—#3927265—Jun. 25, 1996.

(List continued on next page.)

Primary Examiner—Khoi H. Tran
(74) Attorney, Agent, or Firm—Patent Law Offices of Heath W. Hoglund

(57) ABSTRACT

A conveyor assembly includes a support structure for a belt constructed of interlocking segments. The support structure includes straight segments that may be cut to any desired length. These straight segments are joined using a friction-fit connector. The connector does not require any drilling or other modifications to the straight segments. The straight segments may be constructed from a single sheet of stainless steel. The conveyor assembly may also include support arms, legs and other accessories.

49 Claims, 15 Drawing Sheets

U.S. PATENT DOCUMENTS

| | | | |
|---|---|---|---|
| 5,316,134 A | * | 5/1994 | Donohue ................. 198/836.1 |
| 5,447,224 A | | 9/1995 | Gebhardt |
| 5,518,104 A | | 5/1996 | Mattingly et al. |
| 5,566,817 A | | 10/1996 | Meeker |
| 5,690,210 A | | 11/1997 | Layne |
| 5,797,481 A | | 8/1998 | Uber et al. |
| 5,848,958 A | | 12/1998 | Damkjaer |
| 6,009,994 A | | 1/2000 | Stewart |

OTHER PUBLICATIONS

FLEX LINK—Drawing—Connector—#3927266—Jun. 25, 1996.

FLEX LINK—Drawing—Connector SR—#3927267—Jun. 25, 1996.

FLEX LINK—Drawing—Spacer—#397268—Jun. 27, 1996.

FLEX LINK—Drawing—Connecting Plate—#3927269—Jun. 27, 1996.

FLEX LINK—Drawing—Return Beam—#3927272—Jun. 26, 1996.

FLEX LINK Catalog—FlexLink conveyor systems and automation components—1998.

FLEXLINK brochure—The first choice for industry—1998.

FLEXLINK—Conveyor systems and automation components catalog—1995.

FLEXLINK—Conveyor systems and automatoin components Product overview—1998.

AUTOPAK—Graphic: Idle end—partially assembled—2000.

AUTOPAK—Graphic: Idle end—partially assembled—2000.

AUTOPAK—Graphic: Idle end—partially assembled—2000.

AUTOPAK—Graphic: Wheel Bend—partially assembled (close–up)—2000.

AUTOPAK—Graphic: Wheel bend—partially assembled (close–up)—2000.

AUTOPAK—Graphic: Idle end—partially assembled—2000.

AUTOPAK—Graphic: Conveyor Assembly; Idle End, Motor Drive End, Wheel Bend, Idle End, and Wheel End—2000.

FLEXLINK—Drawing: Locked Chain Beam—Option 2—1996.

FLEXLINK—Drawing: Locked Chain Beam—Option 3—1996.

FLEXLINK—Drawing: Stainless Drive Unit—1996.

* cited by examiner

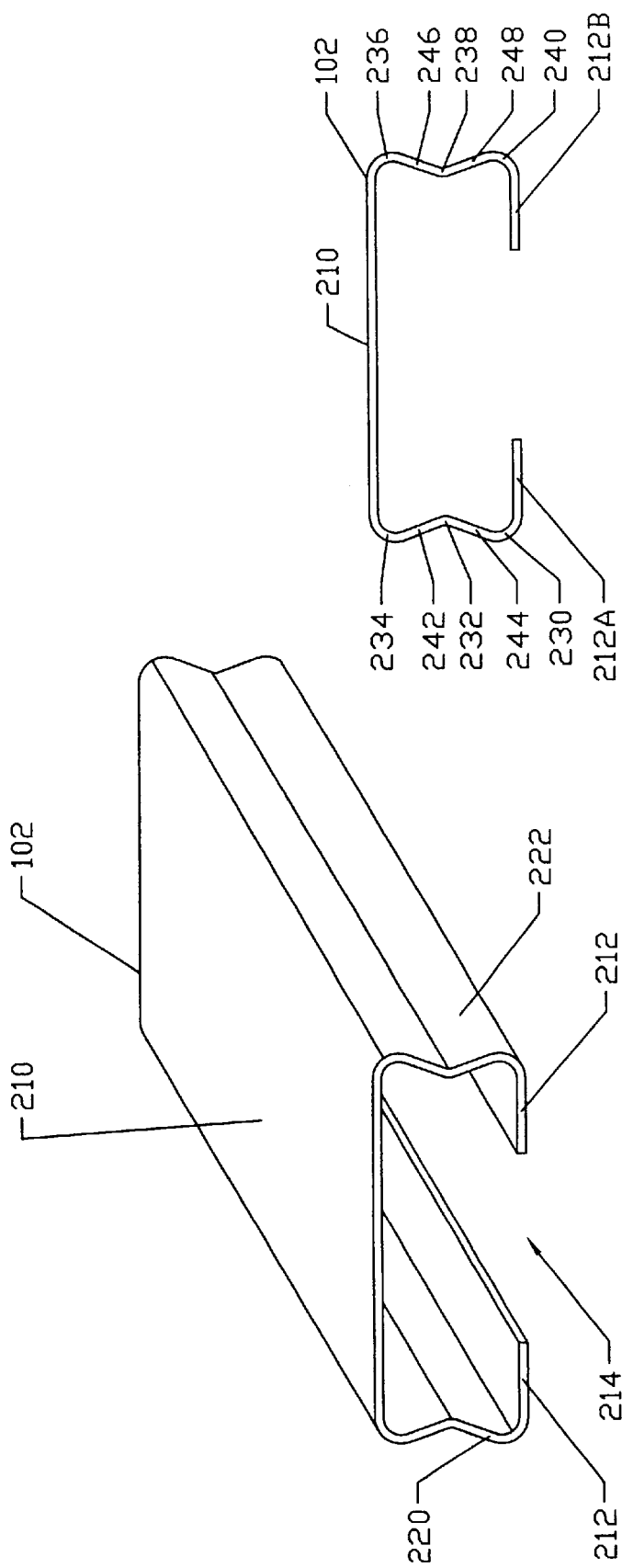

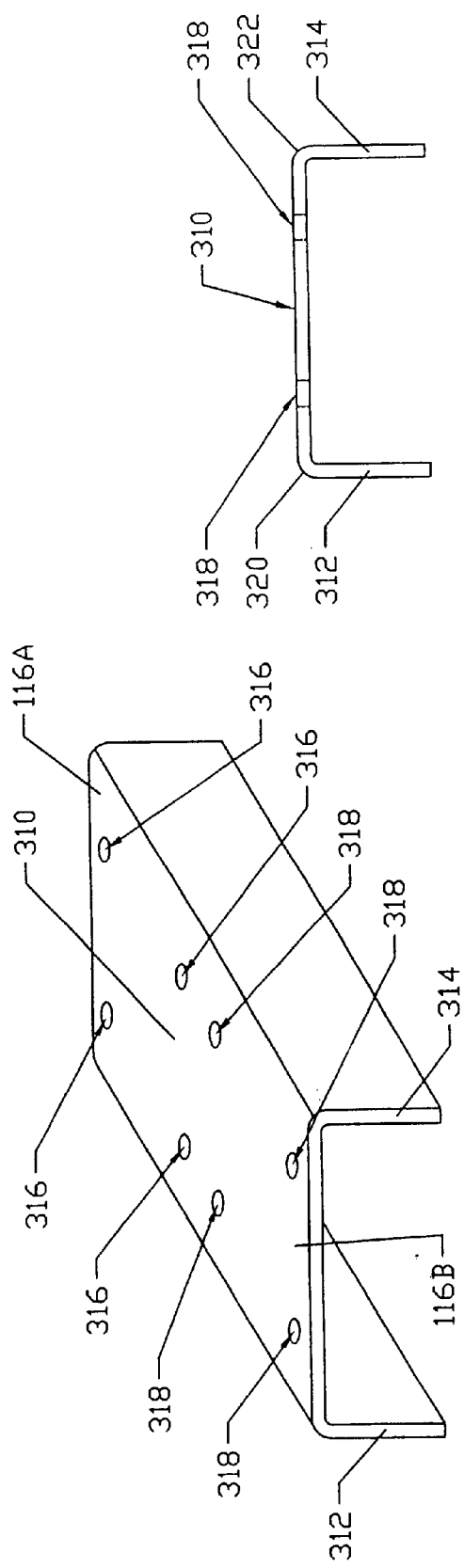

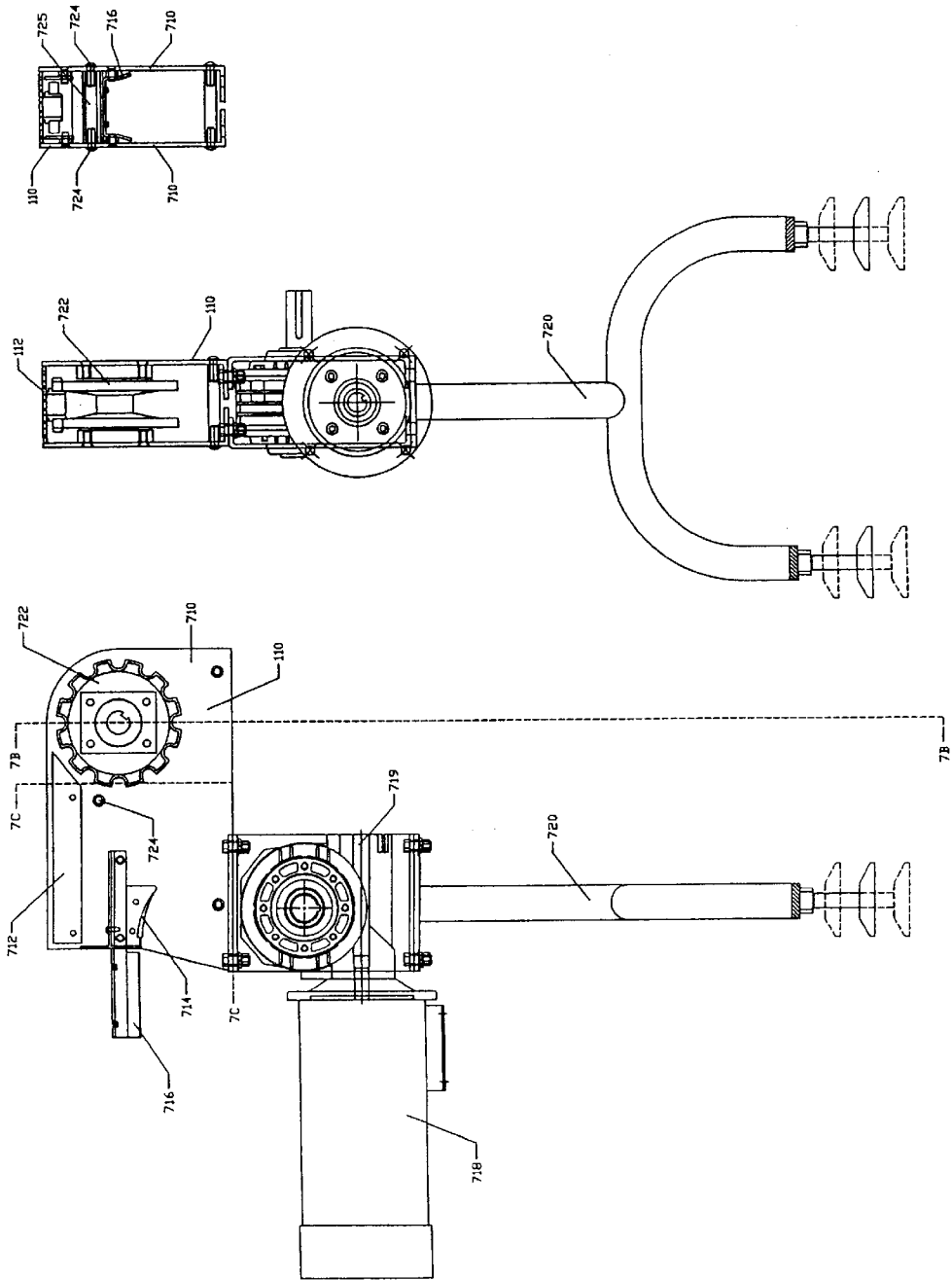

CONVEYOR BELT ASSEMBLY

FIELD OF THE INVENTION

The present invention relates generally to a conveyor belt assembly and more specifically to a conveyor belt support structure used in conjunction with a conveyor belt having a plurality of interlocking segments.

DESCRIPTION OF RELATED ART

Conveyor belts are commonly used to move products through a manufacturing facility. They can be used to move a wide range of products such as machined parts, electronics, foods and pharmaceuticals.

One common conveyor assembly uses interlocking plastic sections to form a conveyor belt. Each plastic section is hingedly attached to two adjacent plastic sections along parallel axes. Together, these interlocked plastic sections form a continuous loop that is used as a convey belt. One typical manufacturer of this type of convey belt and associated assembly is FlexLink. Their products are shown and described in *The FlexLink Catalog*, copyright 1998, and *Conveyor Systems and Automation Components Product Overview*, copyright 1998. Both of these documents are available from FlexLink, and are incorporated herein by reference. FlexLink may be contacted in the U.S. at Flex-Link Systems Inc., 1530 Valley Center Parkway, Suite 200, Bethlehem, Pa. 18017, telephone 1-800-782-1399, or in Sweden at FlexLink Systems AB, Norden, SE-415 50 Got eborg, telephone 1-46-(0)31-337 31 00, or on the Internet at http://www.flexlink.com.

A conveyor assembly made by FlexLink will include a plastic conveyor belt, at least one conveyor beam, an idler end unit and an end drive unit. In addition, the conveyor assembly may include one or more vertical or horizontal bends, guide rails and other related components.

The conveyor beams manufactured by FlexLink are constructed of extruded aluminum. These conveyor beams offer a number of advantages. For example, they are inexpensive to manufacture at virtually any length. For shipping, the aluminum conveyor beams may be cut at fixed lengths. Then, to construct a longer conveyor belt assembly, a number of the fixed length conveyor beams are easily jointed using conveyor beam connectors. The lightweight aluminum provides for easy construction and resists corrosion in most manufacturing environments.

The extruded aluminum conveyor beams, however, also suffer from a number of limitations. For example, in some manufacturing environments, the aluminum conveyor beams suffer from corrosion damage. In addition, some manufacturing facilities must be kept extremely clean. One example of this type of plant is a pharmaceutical or food plant. In these environments, cleanliness is of absolute importance. While extruded aluminum conveyor beams are commonly used in this environment, their construction tends to collect dirt and dust along interior and exterior surfaces that are difficult to clean.

Moreover, in pharmaceutical plants, careful inventory must be maintained of the product. If a conveyor belt is in any way disturbed so that pills, capsules or other products are spilled, industry protocol requires every effort to account for any lost product. Due to its construction, extruded aluminum conveyor beams typically include an interior surface that is difficult to see without dissembling the conveyor belt. As a result, when such a conveyor assembly suffers a disturbance that causes a spill, the lost product may be difficult to recover.

A number of prior art sanitary conveyor systems address these problems. These sanitary conveyor systems may be constructed of stainless steel, or other metals and materials. These sanitary conveyor systems, however, typically require difficult assembly such as drilling or welding at the installation site. Moreover, these sanitary conveyor systems typically offer only limited configuration options without incurring extensive modification work.

SUMMARY OF THE INVENTION

According to one aspect of the invention, a conveyor assembly includes a conveyor beam that has an upper face, a right side wall and a left side wall. The right and left side walls are connected along the right side of the upper face and the left side of the upper face, respectively. Preferably, the right and left face each define a concave surface, but other configurations, including a convex surface, are also acceptable. Together, the upper face, the right side wall and the left side wall of this conveyor beam define a first interior channel. The conveyor assembly also includes another conveyor beam having the same construction as the above-described conveyor beam. A connector fits within the interior channel defined by the two conveyor beams to form a friction fit between the two conveyor beams. The connector has an upper face and a right and left side. The right and left side connect along a right and left side of the upper face, respectively. One end of the connector fits within one conveyor beam, and the other end fits within the other conveyor beam.

According to further aspects of the invention, a plurality of arms are arranged along the first and second conveyor beams. Each of the arms has an upper portion and a lower portion. The lower portion matches the profile of the conveyor beams and engages one of the conveyor beams to form a friction fit therewith. A pair of bars run parallel to the conveyor beams and are supported by the upper portion of the plurality of arms. A conveyor belt rests upon the pair of bars, so that an upper portion of the conveyor belt and the upper face of the conveyor beams define an open space that is accessible from either side of the conveyor housing.

According to further aspects of the invention, the right and left side walls each define a concave surface bounded by the right and left side walls of the first and second conveyor beams. The concave surfaces each include two inclined surfaces configured so that the upper inclined surface meets the upper face at an acute angle. The two conveyor beams each include a lower face connected to the right and left side walls. The lower face defines a slot configured to receive a lower portion of a conveyor belt having a plurality of interlocking plastic segments. The two conveyor beams are each constructed from a single sheet of stainless steel or any other malleable metal or material. The conveyor housing also includes two plastic caps. These cover the edges of the slot along the lower face.

According to further aspects of the invention, the right and left side walls each define a convex surface bounded by the right and left side walls of the first and second conveyor beams.

According to still further aspects of the invention, the connector defines a plurality of threaded holes each configured to receive a threaded rod. The threaded rods engage the upper surface of the conveyor beam to form a rigid, friction fit. The conveyor housing also includes a pair of support arms secured along opposite sides of the conveyor beam.

The lower portion of the support arms match the profile of the conveyor beam. The support arms are secured by a tension member and a compression member positioned substantially between the two support arms. The upper surface of the support arms define a slot configured to hold a support blade in a substantially vertical position. These support blades are covered by plastic caps that support the conveyor belt.

According to additional aspects of the invention, the conveyor includes a wheel bend coupled to the first conveyor beam. The wheel bend includes an upper and a lower wheel configured to support an upper and a lower portion of the conveyor belt, respectively. An axel connects to the center of the upper and the lower wheel. A curved vertical support beam connects with the axel. The vertical support beam has a radius of curvature centered about the axel. This radius of curvature is greater than the radius of the upper and the lower wheel.

According to another aspect of the invention, a conveyor belt assembly includes a conveyor beam, a connector and a conveyor belt. The conveyor beam has an upper face aligned along a substantially horizontal plane, two side walls fixedly attached to the upper face along opposite sides of the upper face, and a lower face fixedly attached to the two side walls. The lower face of the conveyor beam defines a slot configured to engage the conveyor belt. The connector forms a friction fit with the conveyor beam. The conveyor belt has a plurality of individual plastic segments each of which is hingedly attached to two adjacent individual segments.

According to additional aspects of the invention, the connector has an upper face, a first and a second side wall, and at least one threaded rod configured to form a friction fit within the conveyor beam.

According to further aspects of the invention, the conveyor belt assembly includes a leg support arm having a right and left arm positioned on opposite sides of the conveyor beam. A tension member draws the right and left arm together to form a rigid friction fit with the conveyor beam.

According to a further aspect of the invention, the conveyor belt assembly includes a beam attachment bracket configured to attach two conveyor beams in parallel.

According to still further aspects of the invention, the conveyor belt assembly includes two vertical arms. These vertical arms mount against opposite side walls of the conveyor beam. The conveyor belt assembly also includes two support blades each aligned along a substantially vertical plane. Each support blade rests upon one vertical arm. An upper portion of the plastic conveyor belt rests upon the support blades. The support arms are held in place by at least one bolt and a pin. This configuration provides a rigid, friction fit.

According to still further aspects of the invention, the conveyor belt assembly includes a pair of accessory brackets positioned along opposite side walls of the conveyor beam. The accessory brackets form a rigid friction fit with the conveyor beam but do not engage the support blades. The accessory bracket provides support for a guide rail or other accessory.

According to still further aspects of the invention, the conveyor belt assembly includes an attachment block. The attachment block defines a slot that engages the support blades. A threaded rod is turned through the attachment block to form a rigid friction fit between the attachment block and the support blade. The attachment block also defines a hole configured to receive an accessory. Again, a threaded rod is turned through the attachment block to form a rigid friction fit between the attachment block and the accessory.

According to another aspect of the invention, a conveyor belt support structure includes two channels, two vertical support arms, a compression member and a tension member. The support structure is especially suitable for use in conjunction with a plastic conveyor belt having a plurality of interlocking segments. The channels have an upper surface and two walls connected along opposite sides of the upper surface. The vertical supports are positioned along the channel in pairs. The compression member is positioned between one such pair of vertical supports. The tension member joins that pair of vertical support arms.

According to another aspect of the invention, a method of manufacturing a conveyor support assembly includes constructing two support channels by bending a sheet of metal. The support channels each have an upper surface and two side walls. The two support channels have matching profiles. A connector is also formed by bending a sheet of metal. The connector includes an upper surface and two side walls configured to fit within the profile of support channels (also termed conveyor beams). One end of the connector fits within one support channel and the other end of the connector fits within the other support channel. Threaded rods secure the connector within the support channels to form a secure, friction fit. Support arms are placed along opposite sides of the support channels. The support arms are configured to support a conveyor belt. A tension and a compression member are placed between the support arms so that the support arms are rigidly attached to the support channels. The attachment of the support arms does not require drilling in or welding to the first support channel.

Although aspects of the invention have been summarized above, further aspects of the invention will be described below in more detail with reference to the figures.

BRIEF DESCRIPTION OF THE DRAWINGS

FIG. 2A is a perspective view of the conveyor beam 102 of FIG. 1A.

FIG. 2B is an elevation view of conveyor beam 102 of FIG. 1A.

FIG. 3A is a perspective view of connector 116 of FIG. 1B.

FIG. 3B is an elevation view of connector 116 of FIG. 1B.

FIG. 6A is a plan view of wheel bend 108 of FIG. 1A.

FIG. 7A is an elevation view of end drive 110 of FIG. 1A.

FIG. 7B is a cross-sectional view of end drive 110 taken along 7B—7B of FIG. 7A.

FIG. 7C is a cross-sectional view of end drive 110 taken along 7C—7C of FIG. 7A.

DESCRIPTION OF THE PREFERRED EMBODIMENTS

Figure 1A:
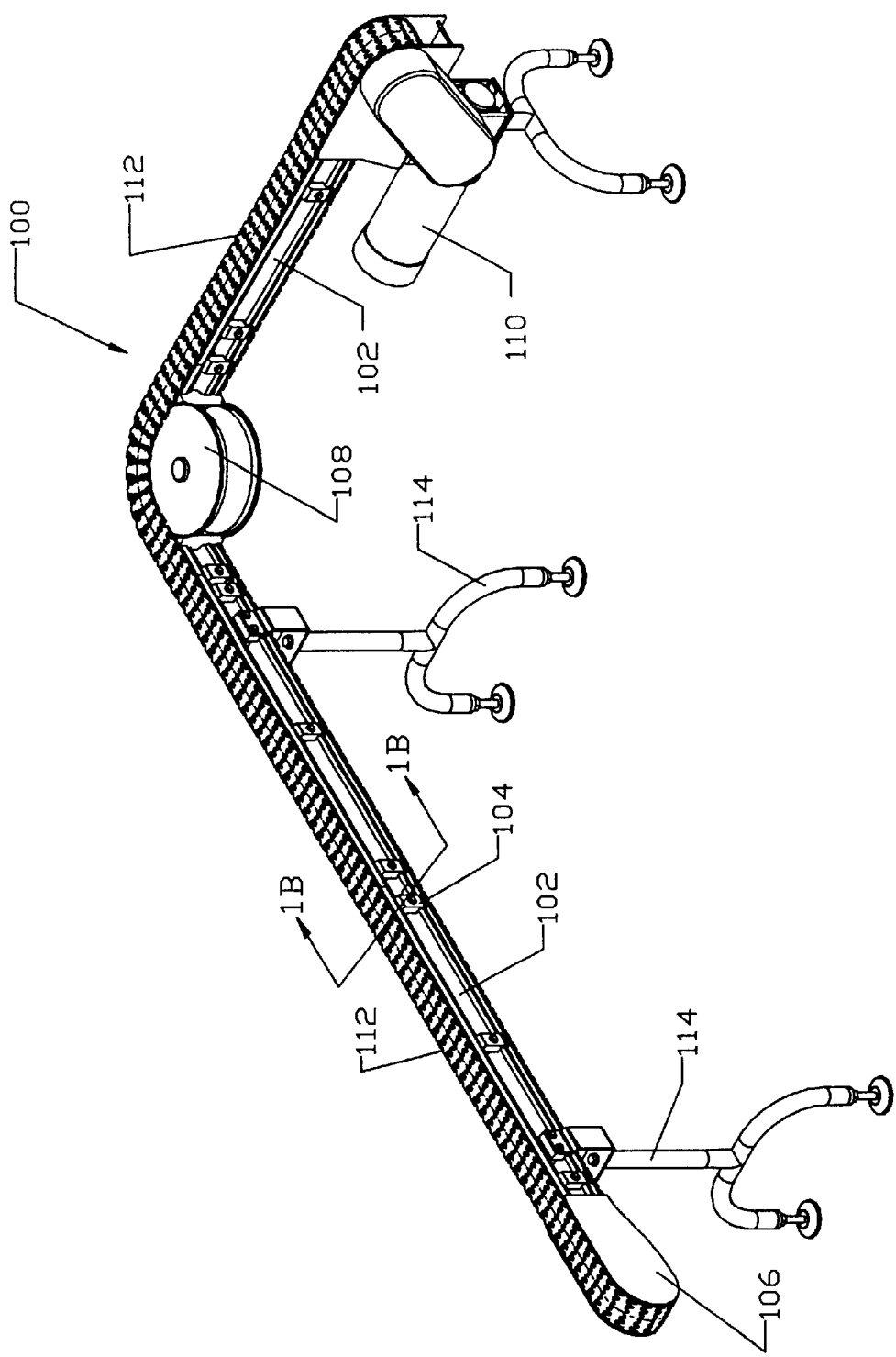
FIG. 1A is a perspective view of one preferred conveyor belt assembly 100 including conveyor beams 102, support arms 104, idler end 106, wheel bend 108, end drive 110, plastic belt 112 and supports 114.

One preferred embodiment of the present invention is shown in FIG. 1A. This conveyor assembly 100 includes conveyor beams 102, support arms 104, idler end 106, wheel bend 108, end drive 110, belt 112 and supports 114. Conveyor assembly 100 is configured to move products along a straight path from idler end 106 to wheel bend 108. At wheel bend 108, the products experience a ninety-degree turn and are then moved along a straight path toward end drive 110. The speed of this path may be controlled depending upon the needs of the particular application. In a production-line application, the product would be received from a processing step at idler end 106 and would be passed to another processing step at end drive 110. In addition, processing steps may be performed along the conveyor assembly 100.

Belt 112 is constructed of a plurality of interlocking plastic segments such as are commercially available from FlexLink, whose contact information may be found above, or Rexnord Corporation, Tabletop Operation, 738 10th Avenue, PO BOX 43, Grafton, Wis. 53024, telephone (414) 375-5160, or Intralox Inc., 201 Laitram Lane, PO Box 50699 Harahan, La. 70123, telephone (504) 733-0463. These interlocking plastic segments are pivotally attached to one another so that the upper portion of belt 112 make a one-hundred-and-eighty-degree turn at idler end 106 and end drive 110. Different models of interlocking plastic segments allow for different turn radii. Acceptable turn radii information may be obtained from the manufacturer. In addition, the interlocking plastic segments also can flex along the horizontal plane defined by the upper surface of the conveyor. This flex allows belt 112 to turn around wheel bend 108. Acceptable turn radii information for this flex may also be obtained from the manufacturer. Along the lower surface of the upper portion of belt 112, a pair of vertical blades (or more generally bars) support the interlocking plastic segments. These blades run along the length of conveyor beams 102 and connect to conveyor beams 102 by support arms 104. The lower portion of belt 112 is also supported by wheel bend 108.

End drive 110 includes a motor that drives a gear (not shown). The teeth of the gear engage the interlocking plastic segments so that when the motor is powered, the gear draws the upper plastic segments toward end drive 110. This effectuates movement along the upper surface from idler end 106 to wheel bend 108 and then to end drive 110.

The conveyor assembly rests upon supports 114. These connect to conveyor beams 102 by a friction fit mechanism that is described further below with reference to FIGS. 13A and 13B.

In this preferred embodiment, conveyor belt assembly 100 uses two straight conveyor beams 102 along the first segment from the idler end 106 to the wheel bend 108. A connector that will be further described below joins these two conveyor beams 102. Depending upon the particular application requirements, additional conveyor beams 102 may be added to extend the reach of this first segment. Likewise, the single conveyor beam 102 that has been used along the second straight segment from wheel bend 108 to end drive 110 may be extended by insertion of addition of conveyor beams 102.

Wheel bend 108 connects the first straight segment to the second straight segment at an approximately ninety-degree angle. Other wheel bends may be used to provide virtually any horizontal or vertical angle and other combinations of wheel bends and straight sections may be used to move products along almost any path.

Figure 1B:
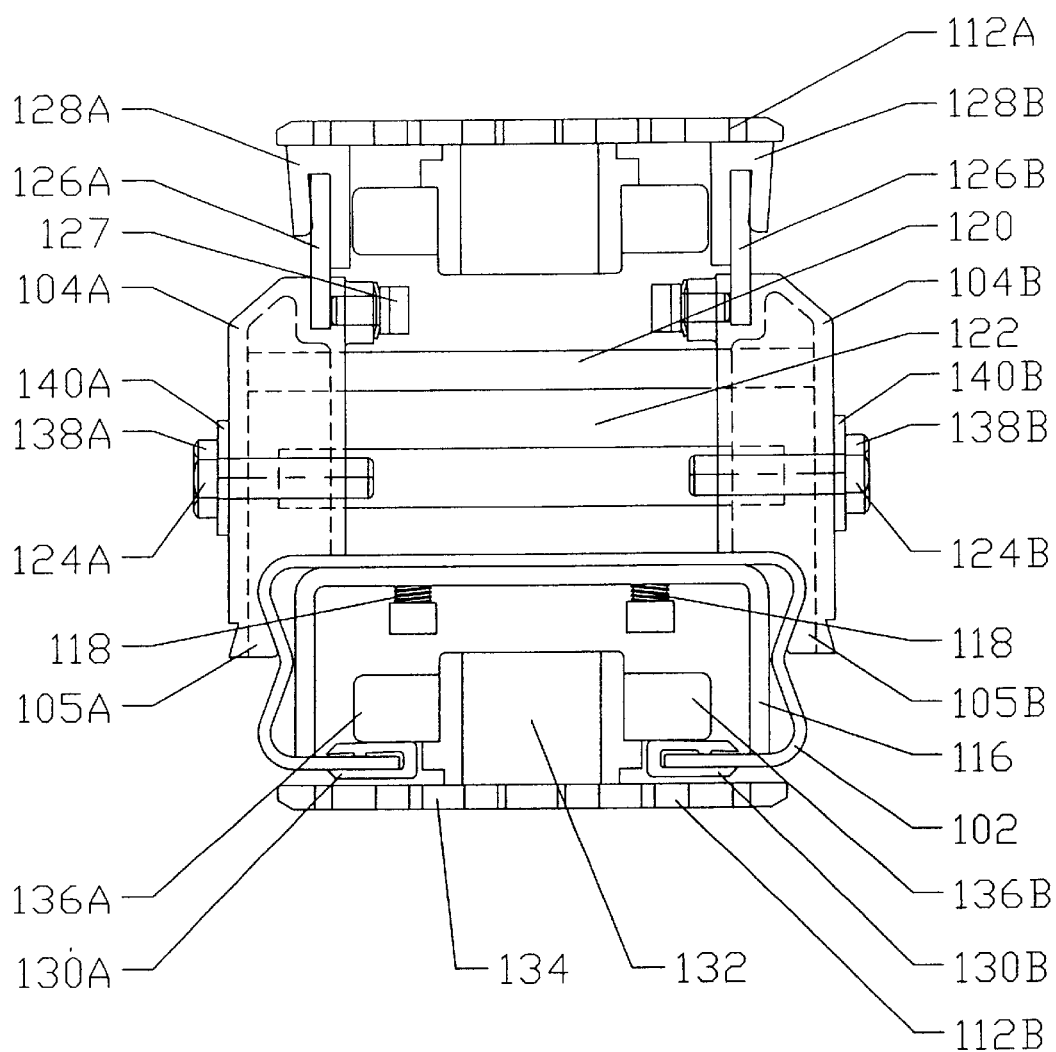
FIG. 1B is a cross-sectional view of conveyor belt assembly 100 taken along 1B—1B of FIG. 1A.
Figure 4D:
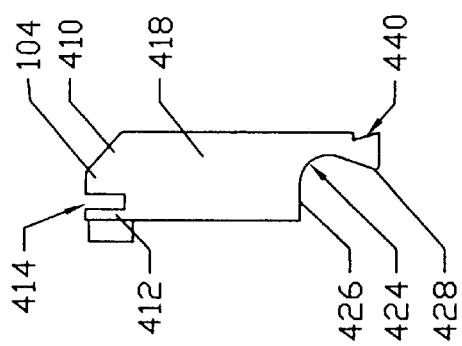
FIG. 4D is an elevation view of support arm 104 of FIG. 1A showing a left side view.
Figure 4C:
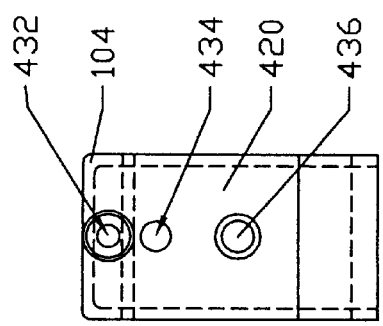
FIG. 4C is an elevation view of support arm 104 of FIG. 1A showing an inside view.
Figure 4B:
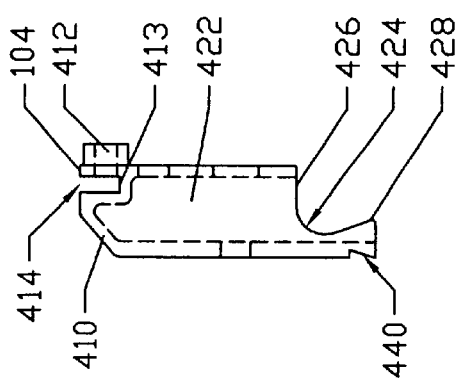
FIG. 4B is an elevation view of support arm 104 of FIG. 1A showing a right side view.
Figure 4A:
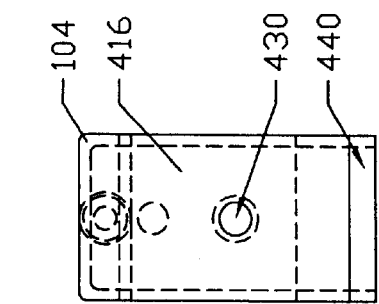
FIG. 4A is an elevation view of support arm 104 of FIG. 1A showing an outside view.

Turning to FIG. 1B, the conveyor assembly 100 will be further described. As shown, belt 112 includes an upper portion 112A and a lower portion 112B. The upper portion of belt 112A is supported from conveyor beam 102 by support arms 104A and 104B, by support blades 126A and 126B and by plastic caps 128A and 128B. More specifically, a lower end 105A and 105B of support arms 104A and 104B, respectively, rest upon conveyor beam 102. Lower ends 105A and 105B each define a horizontal surface that rests upon the upper surface of conveyor beam 102. In addition, lower ends 105A and 105B each extend along the side of conveyor beam 102. The contours of this extension follow the side of conveyor beam 102 so that it forms a tight fit against the side of conveyor beam 102. In other words, the profile of lower ends 105A and 105B match the profile of the respective side of conveyor beam 102.

Approximately midway up support arms 104A and 104B, coupling nut 122 passes through a hole defined by an interior surface of the support arms 104A and 104B. On the left side, the body of bolt 124A is also passed through an exterior surface of support arm 104A and its threaded end engages the left end of coupling nut 122. The bolt head 138A and an associated washer 140A press against the exterior surface of support arm 104A. Likewise, on the right side, the body of bolt 124B is passed through an exterior surface of support arm 104B and its threaded end engages the right end of coupling nut 122. The bolt head 138B and an associated washer 140B press against the exterior surface of support arm 104B. As bolts 124A and 124B are turned into coupling nut 122, they draw the support arms 104A and 104B together. The lower ends 105A and 105B press against conveyor beam 102, and the upper end presses against pin 120.

Pin 120 extends through the interior surface of support arms 104A and 104B to press against the exterior surface of each support arm. This configuration rigidly attaches the support arms 104A and 104B to the conveyor beam 102 without requiring additional support. More specifically, this configuration does not require holes in conveyor beam 102 for bolts, screws, rivets or any other attachment device, nor does it require welds or any other attachment means. As a result, the conveyor beams 102 may be cut to any desired length with out requiring any further manufacturing process for attaching the support arms. The support arms 104A and 104B may be added anywhere along the length of the conveyor beams 102.

Support blades 126A and 126B rest within a slot in support arms 104A and 104B, respectively. To hold the support blade 126A firmly in place, a bolt 127 passes through a threaded hole in support arm 104A. The bolt is turned against support blade 126A to hold support blade 126A firmly in place.

The lower portion of belt 112B is supported by a slot defined by the lower surface of conveyor beam 102, and protected using plastic caps 130A and 130B.

More specifically, each plastic segment of conveyor belt 112 includes a body 132, a conveyor surface 134 and a pair of lugs 136A and 136B situated on opposite sides of the body 132. Body 132 fits within the slot defined by the lower surface of conveyor beam 102, while lugs 136A and 136B extend beyond the slot on the top side and conveyor surface 134 extends beyond the slot on the bottom side. As a result, the plastic segments of belt 112 are prevented, within certain tolerances, from moving laterally between plastic caps 130A and 130B and from moving vertically, within certain tolerances, by plastic caps 130A and 130B, which are situated between conveyor surface 134 and lugs 136. However, the lower portion of belt 112B is free to move longitudinally within the slot defined by the lower surfaces of conveyor beam 102. In operation, the upper portion of belt 112A moves along plastic caps 128 in a first direction while the lower portion of belt 112B moves along plastic caps 130 in the opposite direction.

In an alternative embodiment, the lower portion of belt 112B may run inside the conveyor beam and rest on top of the lower face of the conveyor beam. In this configuration, the conveyor beam must be at least as wide as the conveyor belt 112. Specifically, turning to FIG. 1B, the interior of the connector must be at least as wide as the conveyor belt 112.

Returning to the embodiment shown in FIG. 1, The friction between plastic caps 128 or 130 and the plastic belt 112 is less than the friction between the stainless steel support blades 126 and the plastic belt 112. Accordingly, plastic caps 128 and 130 are used to minimize wear on belt 112.

Returning to the upper portion of belt 112A, since the lugs of the respective plastic segments are not engaged by a slot, the upper portion may be lifted off of the support blades 126A and 126B. For a conveyor belt fixed along a support assembly, the belt tension will determine how far off the belt may be lifted from the support blades 126A and 126B As mentioned above, additional conveyor beams 102 may be added to increase the length of a conveyor segment. Additional beams are attached using a connector 116 and screws 118. Screws include an allen-keyed head and a threaded body. Of course, those skilled in the art will appreciate that other screw heads may be used. The connector 116 fits within the conveyor beam 102. As screws 118 are turned through connector 116 they begin to press against conveyor beam 102 and force connector 116 to press against conveyor beam 102 as well. This high-friction fit acts to secure one end of connector 116 within conveyor beam. To add another conveyor beam, the other end of connector 118 is simply placed within the additional conveyor beam and screws are again used to provide a high-friction fit.

This particular configuration avoids the use of bolts, screws, rivets, welds or other attachment means that would require structural modification to a conveyor beam. As a result, the conveyor beams may be cut to any desired length and connected using this simple mechanism. This provides an efficient means for installing a new conveyor belt system in a manufacturing plant.

Turning to FIGS. 2A and 2B, one preferred conveyor beam will be described in further detail. Conveyor beam 102, also of FIG. 1A, is preferably constructed from a single sheet of stainless steel or any other malleable metal. The single sheet of stainless steel is rectangular having a base of significantly greater dimension than its height. This single sheet of stainless steel is bent to form conveyor beam 102, and the elongated base of the rectangular sheet extends along the length of the conveyor beam 102. Of course, those skilled in the art will appreciate that the conveyor beam may be constructed using other manufacturing methods.

More specifically, conveyor beam 102 includes an upper face 210 that defines a substantially horizontal plane. The upper face is rectangular in shape. The side of the rectangle that extends along the length of the conveyor beam 102 is significantly longer than the other side of the rectangle.

Side wall 220 connects to upper face 210 along one of its long sides. Side wall 222 connects to upper face 210 along the opposite side. Both sidewalls 220 and 222 extend along the length of the conveyor beam 102. Side walls 220 and 222 are both bent inward so that each defines a concave surface. The lower end of side walls 220 and 222 connect to a lower face 212. As with the upper face 210, lower face defines a substantially horizontal plane parallel to that of the upper face 210. In addition, lower face 212 defines a slot 214 that is used to engage and support the interlocking plastic segments of the conveyor belt assembly 100.

Turning to FIG. 2B, the contours of conveyor beam 102 will be further described. Side wall 220 (shown in FIG. 2A) includes an upper inclined wall 242 and a lower inclined wall 244. Upper inclined wall 242 connects with upper face 210 along bend 234. The interior angle defined by bend 234 is less than ninety-degrees (acute). Likewise side wall 222 (shown in FIG. 2A) includes an upper inclined wall 246 and a lower inclined wall 248. Upper inclined wall 246 connects with upper face 210 along bend 236. The interior angle defined by bend 236 is less than ninety-degrees. As the screws or bolts (or more generically, threaded rods) are turned through connector 116 to press against upper face 210, connector 116 presses against lower face 212. This provides a rigid, high-friction fit between the conveyor beam 102 and connector 116.

Upper inclined wall 242 connects to lower inclined wall 244 along bend 232. The exterior angle defined by bend 232 is greater than ninety degrees (obtuse). Likewise, upper inclined wall 246 connects to lower inclined wall 248 along bend 238. The exterior angle defined by bend 238 is greater than ninety degrees.

Lower inclined wall 244 connects to a left portion of lower face 212A along bend 230. The interior angle defined by bend 230 is less than ninety degrees and the left portion of lower face 212A is substantially parallel to upper face 210. Likewise, lower inclined wall 248 connects to a right portion of lower face 212B along bend 240. The interior angle defined by bend 240 is less than ninety degrees and the right portion of lower face 212B is substantially parallel to upper face 210.

Again, the slot defined between the lower face 212A and lower face 212B is used to engage and support plastic segments of a conveyor belt. The space between lower inclined wall 244 and lower inclined wall 248 houses the lugs 136 of the plastic segments (shown in FIG. 1B).

Again, conveyor beam 102 is preferably constructed of a single sheet of stainless steel. Each of bends 230–240 are made in this single sheet of stainless steel. When used in conjunction with conveyor belt assembly 100, conveyor beam 102 does not require any further construction. Specifically, conveyor beam 102 does not require any holes or other modifications for attachment with the other parts of the conveyor belt assembly 100. As a result, the conveyor beam 102 may be cut on location to any desired length and easily assembled with no drilling or welding required.

Turning to FIGS. 3A and 3B, one preferred connector will be described in further detail. Connector 116 includes an upper face 310, a side wall 312 and a side wall 314. Upper face 310 is substantially rectangular and connects to side wall 312 along bend 320. Upper face 310 connects to side wall 314 along bend 322 which is on the opposite side of bend 320. Bends 320 and 322 each define an interior angle of approximately ninety degrees. The bottom surface of side walls 312 and 314 engage a left portion of lower face 212A and a right portion of lower face 212B, respectively.

A first end of connector 116A defines four threaded holes 316. These are used to receive threaded rods that engage the conveyor beam. The threaded rods are turned through upper surface 310 so that the threaded rods will contact the upper face 210 of conveyor beam 102. As described above, this forms a rigid friction-fit with that conveyor beam. A second end of connector 116B also defines four threaded holes 318. These are also used to receive threaded rods that engage the second conveyor beam. This forms a rigid friction-fit with the second conveyor beam and operates to joint the two conveyor beams together. By combining such conveyor beam segments, virtually any length can be provided.

Alternatively, in another preferred embodiment, the threaded holes are positioned along the corners of connector 116 so that the threaded rods that pass therethrough press against bends 234 and 236. The threaded holes may placed at other locations provided the threaded holes are positioned so that when the threaded rods are turned therethrough, the connector forms a friction fit with the conveyor beam.

Preferably, the connector is constructed from a single sheet of stainless steel of the same composition as conveyor beams 102. Of course, those skilled in the art will appreciate that the connector can be made using other material and/or construction techniques. Likewise, the conveyor beams and other components can be made using other materials and/or construction techniques.

Turning to FIGS. 4A–4D, one preferred support arm will be described in further detail. Support arm 104 includes blade guides 410 and 412, which are arranged along its top portion. Blade guides 410 and 412 define a vertical slot 414 this is approximately the same width as, or just slightly wider than support blade 126 (shown in FIG. 1B). Blade guides 410 and 412 are connected along their bottom by blade rest 413. This provides a lower bounds for slot 414. As part of conveyor belt assembly 100, slot 414 holds support blade 126 in a substantially vertical orientation.

Support arm 104 also includes an exterior face 416, a left face 418, an interior face 420 and a right face 422. The interior face 420 defines a threaded hole 432. A bolt is turned through hole 432 to secure support blade 126 in place (shown in FIG. 1B). More specifically, the end of the bolt presses against the interior side of support blade 126 and forces the exterior side of support blade 126 against blade guide 410. This provides a rigid, high-friction fit that prevents any movement of the support blade 126.

A top portion of left face 418 and a top portion of right face 422 connect to the bottom portion of blade guides 410 and 412. The bottom portion of left face 418 and the bottom portion of right face 422 each include a beam contour 424. Beam contour 424 is shaped to match the profile of the conveyor beam 102. Beam contour 424 includes a horizontal portion 426 that rests upon the top of conveyor beam 102. Beam contour 424 also includes an inclined portion 428 that matches the slope of the upper inclined wall of the conveyor beam 102. When support arm 104 engages conveyor beam 102, inclined portion 428 prevents the support arm 104 from moving in a vertical direction. When used in combination with another arm, this provides a rigid friction fit with a conveyor beam.

Approximately midway along support arm 104, exterior face 416 defines a bolt hole 430. Interior face 420 also defines a bolt hole 436 at the same level, and a pin hole 434 positioned above bolt hole 436. As part of conveyor assembly 100, a bolt is passed through bolt holes 430 and 436 to engage a coupling nut. A pin is passed through pin hole 434 and presses against exterior face 416. Returning to FIG. 1B, turning bolt 124A or 124B into coupling nut 122 draws support arms 104A and 104B together. As the bolts 124A and 124B are further tightened, they act as part of a tension member connecting support arms 104A and 104B. In opposition, pin 120 presses against the exterior of support arms 104A and 104B to keep the arms a fixed distance apart. In this regard, as the bolts 124A and 124B are tightened, pin 120 acts as a compression member.

The lower exterior face of support arm 104 defines a substantially horizontal groove 440. The lower end of any auxiliary attachment provides a lip to engage the horizontal groove 440. This groove 440 secures the base of any auxiliary attachment in a perpendicular position while using only one bolt to attach the base. Moreover, this attachment mechanism does not require any further drilling or any other manufacturing process.

Preferably, support arms 104 are constructed of stainless steel of the same composition as conveyor beams 102.

Figures 5A, 5B, 5C:
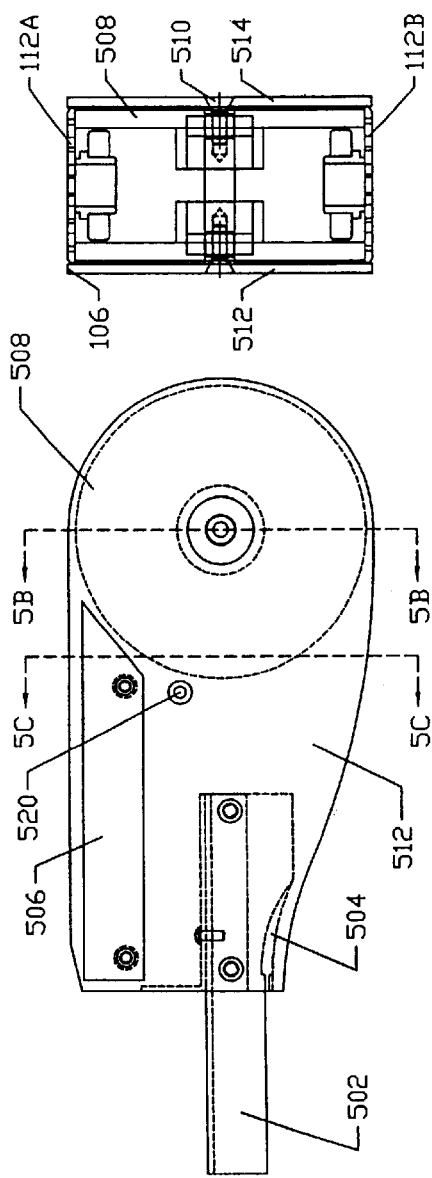
FIG. 5B is a cross-sectional view of idler end 106 taken along 5B—5B of FIG. 5A.
FIG. 5C is a cross-sectional view of idler end 106 taken along 5C—5C of FIG. 5A.

Turning to FIGS. 5A–5C, one preferred idler end will be described in further detail. FIG. 5A shows the idler end without a conveyor belt. FIG. 5B shows the idler end with a conveyor belt. FIG. 5C shows the idler end with an upper portion of the conveyor belt. Idler end 106 (shown in FIG. 5A) includes a side wall 512 and a side wall 514. The distance between the interior surface of these walls is approximately equal to the width of the conveyor surface. Side walls 512 and 514 are connected by connector 502, bolts 510, axle 511, bolts 520, and coupling nut 521. Connector 502 extends beyond side walls 512 and 514 and provides an end with approximately the same shape as one end of connector 116. Accordingly, connector 502 is used to provide a rigid, high friction fit with a conveyor beam 102.

As a lower surface of a conveyor belt is received by idler end 106, the lower surface is supported and guided by lower support 504. This support is preferably constructed or covered with plastic to reduce friction with the plastic conveyor belt segments. Lower support 504 is positioned at an incline having a higher end substantially aligned with the lower surface of a connecting conveyor beam, and having a lower end directed toward the bottom surface of wheel 508. This configuration acts to guide the conveyor belt to the wheel 508.

Wheel 508 rotates on axle 510 which is attached to side walls 512 and 514. The conveyor belt is drawn around wheel 508 so that the incoming lower surface of the conveyor belt is fed out the top of idler end 106. More specifically, after passing around wheel 508, the conveyor belt rests upon upper support 506. Upper support 506 is substantially aligned with the vertical support blades of the conveyor assembly and with the upper surface of wheel 508. As a result, after the conveyor belt passes around wheel 508, it remains upon a flat path along the upper surface of the conveyor belt.

Figure 6A:
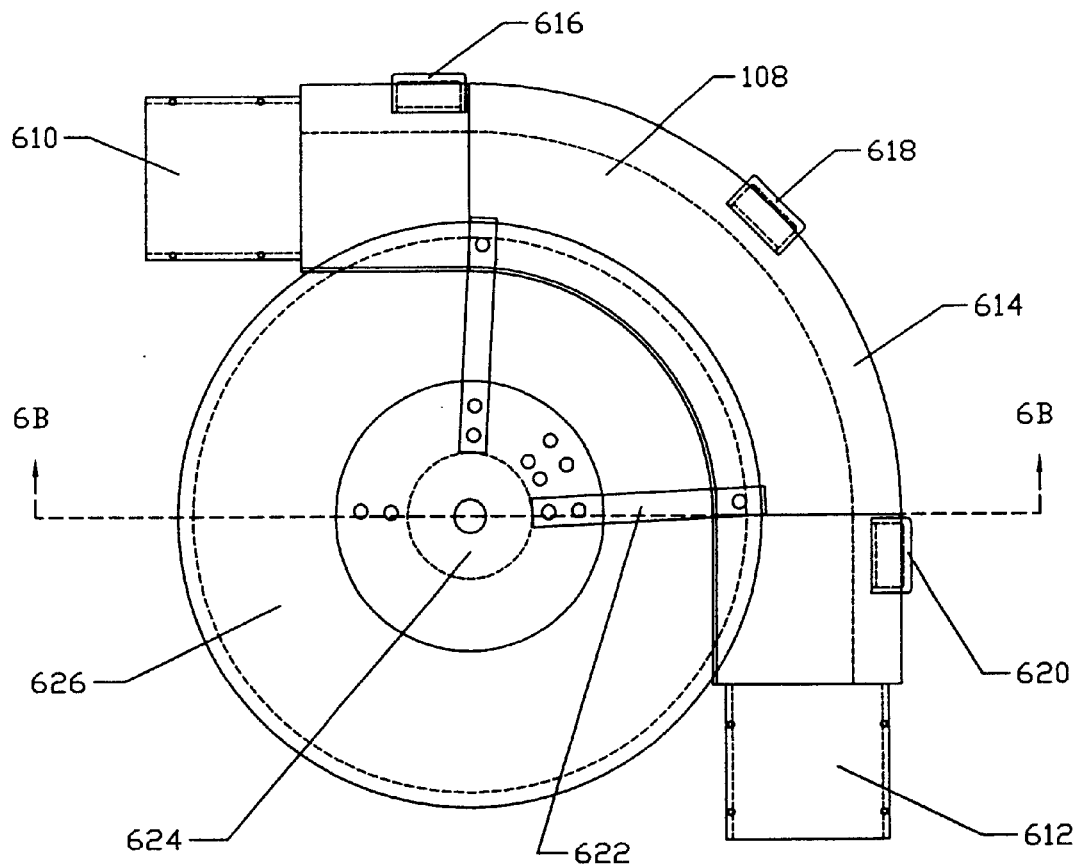
FIG. 6A is an elevation view of idler end 106 of FIG. 1A.
Figure 6B:
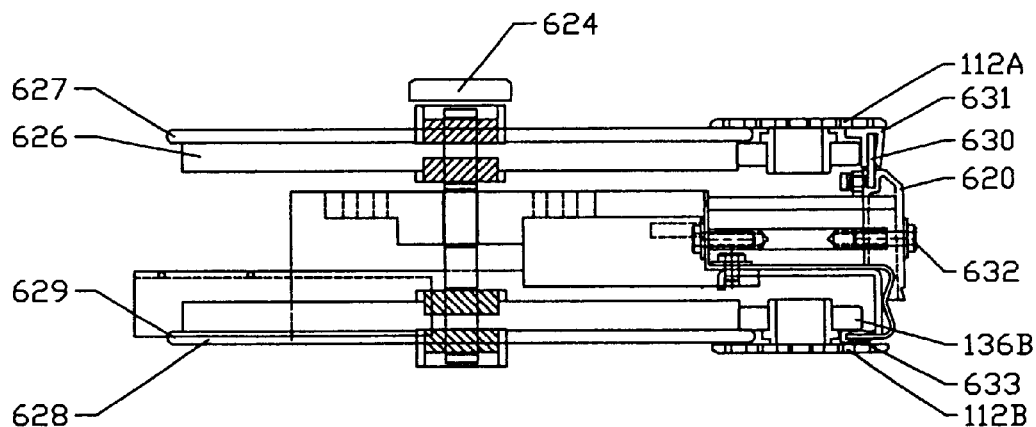
FIG. 6B is a partial cross-sectional view of wheel bend 108 taken along 6B—6B of FIG. 6A.

Turning to FIGS. 6A and 6B, one preferred wheel bend will be described. Wheel bend 108 includes connectors 610 and 612 configured to attach it to a conveyor beams 102. Connectors 610 and 612 are mounted within body 614 and extend beyond body 614 to provide an end with approximately the same shape as one end of connector 116. Accordingly, connectors 610 and 612 are used to provide a rigid, high-friction fit with a conveyor beam 102.

Support arms 616, 618 and 620 connect to body 614 approximately along the path of a circle having a center coincident with the center of axel 624. Support arms 616, 618 and 620 have substantially the same shape as support arm 104 except for pin and bolt assemblies. Support arms 616, 618 and 620 are welded directly to body 614, in addition, or alternatively, support arms 616, 618 and 620 may be bolted to body 614. Each support arm 616, 618 and 620 defines a slot 634 that holds a curved support beam 630. Curved support beam 630 follows the path of a circle having a center coincident with the center of axel 624. A portion of curved support beam 630 is covered by a plastic cap 631. Plastic cap 631 extends between the lower surface of the upper portion of the conveyor belt and the lugs of the plastic segments. Plastic cap supports a portion of the upper surface of belt 112 along the outer side of wheel bend 108 and the inside is supported by upper wheel 626. Upper wheel 626 is mounted along axel 624, which is in turn supported by upper axel support 622 and body 614. Upper axel support 622 extends from the body to the top of axel 624. Upper wheel 626 also includes a lip 627 that extends between the conveyor surface and lugs of the plastic segments.

In one preferred mode of operation, the conveyor belt moves from the end nearest connector 610 to the end nearest connector 612. The conveyor segments are received at the end nearest connector 610 and move along a curved path that is also centered coincident with the center of axel 624. The lip on plastic cap 631 and the lip 627 on upper wheel 626 support the conveyor segments along this path and also prevent the segments from being lifted off this support surface. Since the conveyor segments are more likely to jump off of their prescribed path when they encounter a curve, these lips help prevent such derailments.

The upper face of plastic cap 631 and upper wheel 626 are substantially aligned with the vertical support blades of the conveyor assembly. As a result, the conveyor belt passes smoothly to and from the wheel bend 108.

The lower path of belt 112B is supported by a curved face, which is also covered by a plastic cap. The curved face is substantially aligned with the curvature of curved support blade 630. The plastic cap 633 extends between the conveyor surface 112B and lugs of the plastic segments 136B. Accordingly, the plastic cap 633 supports a portion of the lower surface of belt 112B along the outer side of wheel bend 108 and the inside is supported by lower wheel 628. Lower wheel 628 is also mounted along axel 624, which is in turn supported by upper axel support 622 and body 614. However, since belt 112 moves in the opposite direction along the lower surface than it does along the upper surface, lower wheel 628 is free to rotate in the opposite direction as upper wheel 626. Lower wheel 628 also includes a lip 629 that extends between the conveyor surface and lugs of the plastic segments.

As part of conveyor assembly 100, lip 629 will align with plastic cap 130A (shown in FIG. 1B), and the other plastic cap will align with plastic cap 130B. With this configuration, the lower portion of belt 112 is firmly secured along a continuous path.

Preferably, the connectors 610 and 612, the body 614, the support arms 616618, the curved support beam 630, and the bolt 632 are all constructed of stainless steel. The upper and lower wheel 626 and 628 are preferably constructed of plastic.

Turning to FIG. 7, one preferred end drive 110 will be described. End drive 110 includes a body 710 that provides support for the various drive components. More specifically, motor 718 connects to body 710. The rotational speed of the motor is decreased through a reducer. Moreover, the drive speed of motor 718 is adjusted in accordance with the needs of the associated manufacturing process.

Connector 716 is also attached to body 710 and is configured to attach end drive 110 to a conveyor beam 102. Connector 716 is mounted within body 710 and extends beyond body 710 to provide an end with approximately the same shape as one end of connector 116. Accordingly, connector 716 is used to provide a rigid, high-friction fit with a conveyor beam 102. The opposite faces of body 710 are held together by connector 716, the axel of gear 722, bolt 724 and coupling nut 725.

Body 710 also connects to an upper support 712, which is substantially aligned with support blades 126A and 126B. Gear 722 engages the plastic sections of the belt 112. As gear 722 is driven by motor 718, it draws belt 112 toward end drive 110. The belt is passed from support blades 126A and 126B to upper support 712. The alignment between blades 126A and 126B and upper support 712 provides a continuous path for belt 112.

As gear 722 draws plastic segments into drive end 110, the plastic segments are passed from the upper face to the lower face of the conveyor belt. Lower support 714 receives the plastic segments from the lower side of gear 722 and supports and guides the plastic segments as they are passed out of end drive 110 to a conveyor beam 102. Lower support 714 is positioned at an incline having a higher end substantially aligned with the lower surface of a connecting conveyor beam, and having a lower end directed toward the bottom surface of gear 722. This configuration acts to guide the conveyor belt from sprocket 722 to conveyor beam 102.

Leg 720 also connects to body 710 and provides support for the end drive 110.

Preferably, body 710, upper support 712, lower support 714, connector 716 and leg 720 are constructed of stainless steel. Gear 722 and covers for upper support 712 and lower support 714 (not shown) are preferably constructed of plastic.

Figure 8:
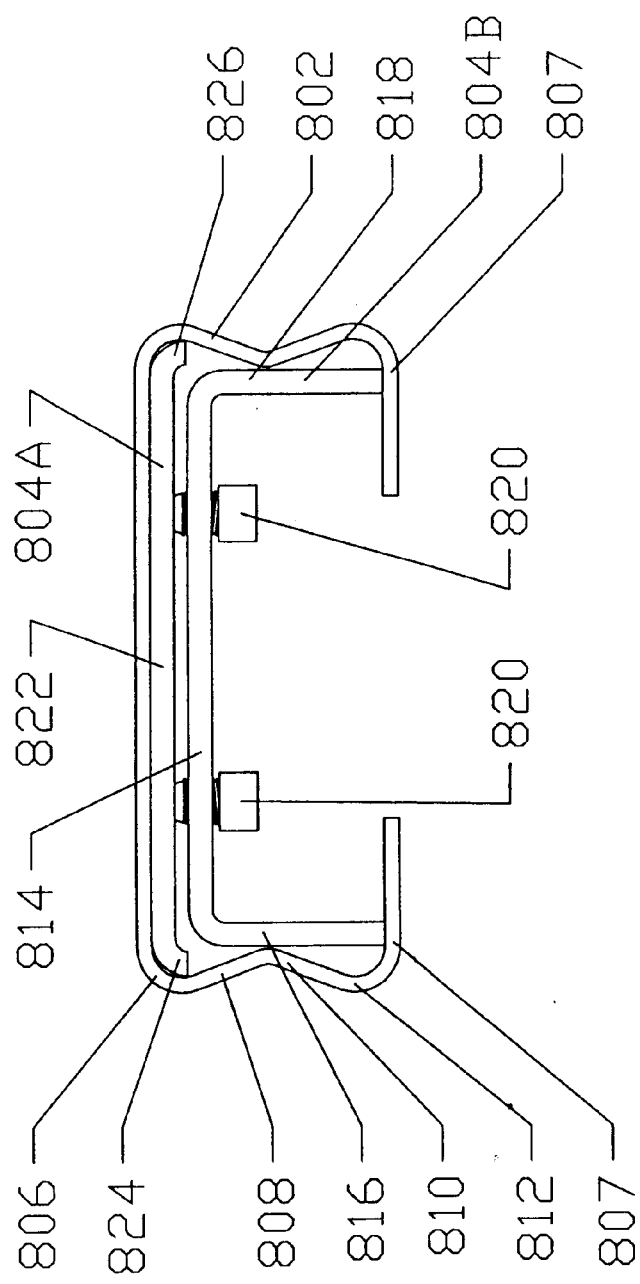
FIG. 8 is an elevation view of another preferred conveyor beam 802 and connector 804.

Turning to FIG. 8, another preferred conveyor beam 802 and connector 804 will be described. Connector 804 is preferably constructed from stainless steel. It includes an upper portion 804A and a lower portion 804B. Lower portion 804B includes an upper surface 814 that bends on each side to form vertical walls 816 and 818. Vertical walls 816 and 818 meet the upper surface 814 at approximately a ninety degree angle. The upper surface 814 defines a plurality of threaded holes configured to receive bolts 820. Upper portion 804A includes an upper surface 822 that bends on each side to form side bends 824 and 826.

As bolts 820 are turned through the treaded holes, they push against the lower surface 822. This forces the bottom edge of vertical walls 816 and 818 against a lower face 807 of conveyor beam 802. Likewise, this forces the upper end of vertical walls 824 and 826 against an upper face 806 of conveyor beam 802. As bolts 820 are further extended through upper surface 814, connector 804 forms a rigid, high-friction fit with conveyor beam 802. This prevents any movement between the two parts. Connector 804 is used to make a connection on each of its ends with a conveyor beam so that the two conveyor beams are joined into a single conveyor beam. Again, this allows easy construction of virtually any length.

Figure 9:
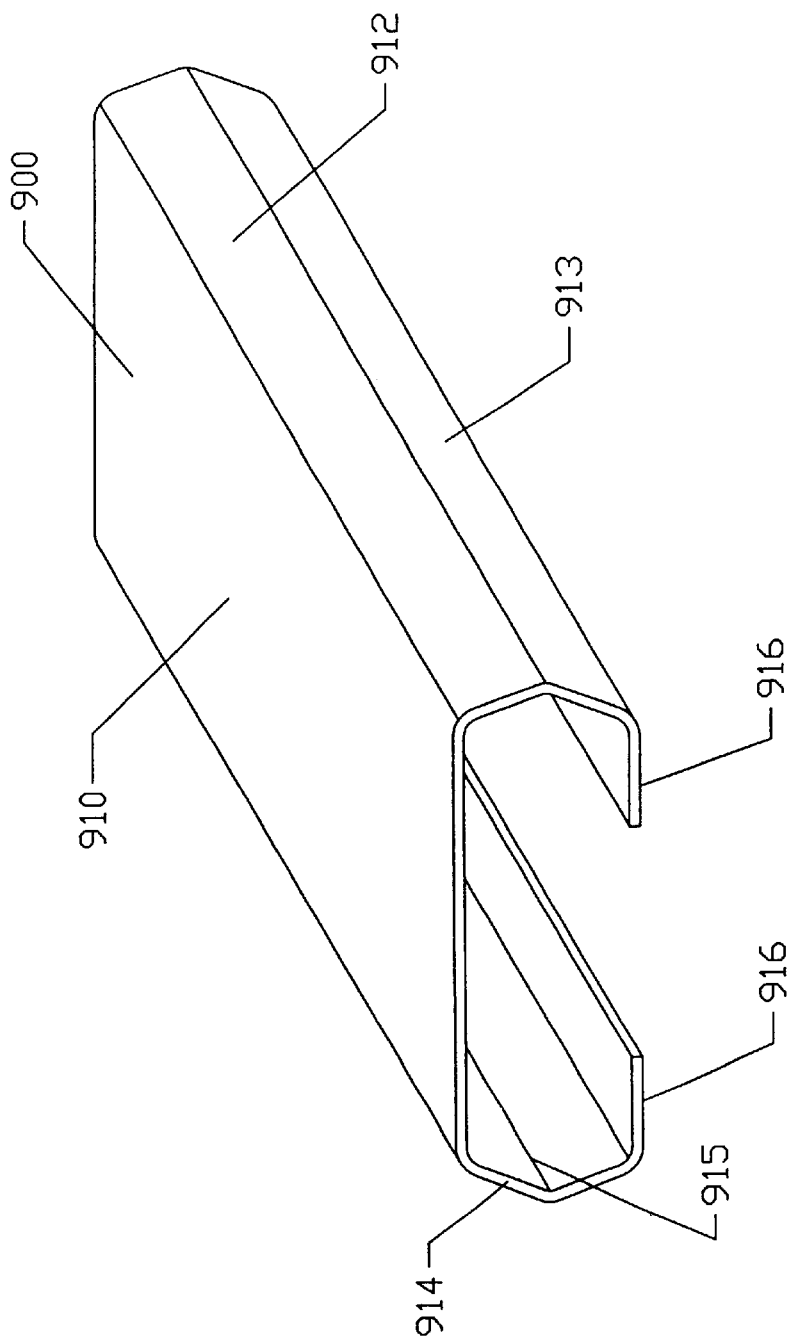
FIG. 9 is a perspective view of another preferred conveyor beam 900.

Turning to FIG. 9, another preferred support beam 900 will be described. Support beam 900 is constructed from a sheet of metal having a substantially rectangular shape. The sheet of metal is bent to form an upper face 910, side walls 912 and 914, and lower face 916. Side walls 912 and 914 are also bent to form a convex surface. The bend 913 and 915 is used to engage the lower portion of a connector, such as the one shown in FIG. 8. Support arms may be attached to the support beam 900 in the same manner as is used to attach support arms to beam shown in FIG. 2. In this configuration, the lower profile of the support arms match the convex profile of the support beam 900.

Figure 10:
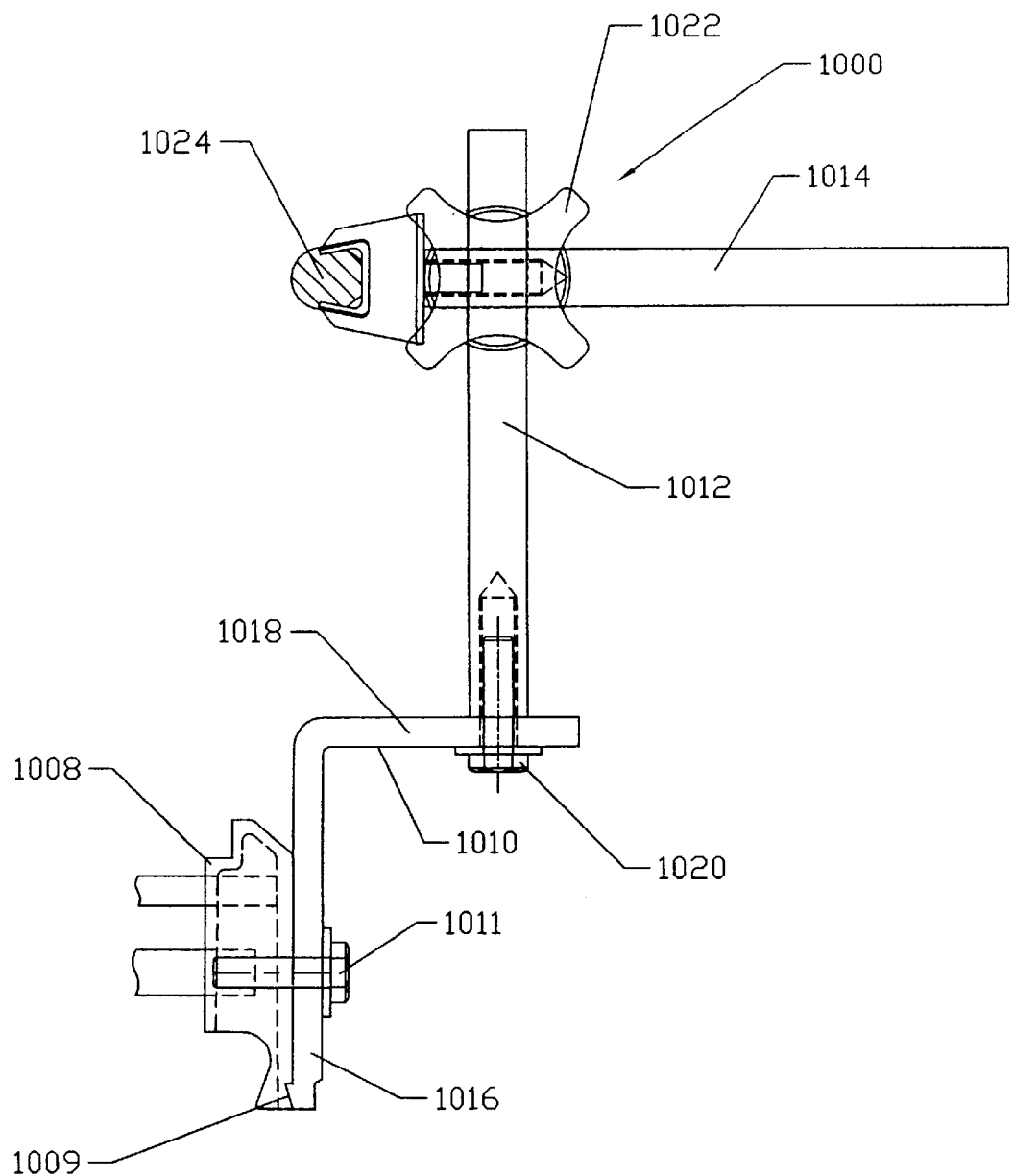
FIG. 10 is an elevation view of one preferred guide support 1000 that includes a vertical arm 1008, a base 1010, a body 1012 and a support arm 1014.

Turning to FIG. 10, one preferred guide assembly will be described. The guide assembly is used to prevent products from falling off of the conveyor assembly, as is especially likely to occur around bends. Guide assembly 1000 includes an accessory bracket 1008, a base 1010, a body 1012 and an arm 1014. Accessory bracket 1008 is constructed in substantially the same manner as arm support 104 except that it does not include blade guide 412. Accessory bracket 1008 may be added anywhere along a conveyor beam. Since it does not include an interior blade guide (i.e., blade guide 412), it may be added even after the conveyor has been assembled. Accessory bracket(s) 1008 are added in pairs using a tension and compression member as described above with reference to arm support 104. This configuration forms a rigid friction fit with the conveyor beam 102.

Base 1010 includes a vertical mounting surface 1016 and a horizontal support surface 1018. Mounting surface 1016 defines a hole. Mounting surface 1016 is placed against accessory bracket 1008 and its hole is aligned to pass a bolt 1011 through to accessory bracket 1008. Bolt 1011 engages a coupling nut and forms part of the tension member, which is further described above.

The lower exterior face of accessory bracket 1008 defines a substantially horizontal groove 1009. The lower end of mounting surface 1016 has a protruding lip to engage the horizontal groove 1009. This secures the base 1010 in a perpendicular position while using only one bolt to attach the base. Moreover, this attachment mechanism does not require any further drilling or any other manufacturing process.

Support surface 1018 also defines a hole (or multiple holes) along its outer end. This hole passes bolt 1020, which connects with a lower end of body 1012. Body 1012, also defines a passage for arm 1014 and includes a threaded knob 1022 that is used to hold arm 1014 in place. Loosening knob 1022 allows arm 1014 to slide through the passage in body 1012 in a horizontal direction. Arm 1014 connects to a guide 1024 (shown in cross section) that runs along the length of the conveyor. Arm 1014 is adjusted in accordance with the width of the products carried by the conveyor.

Figure 11:
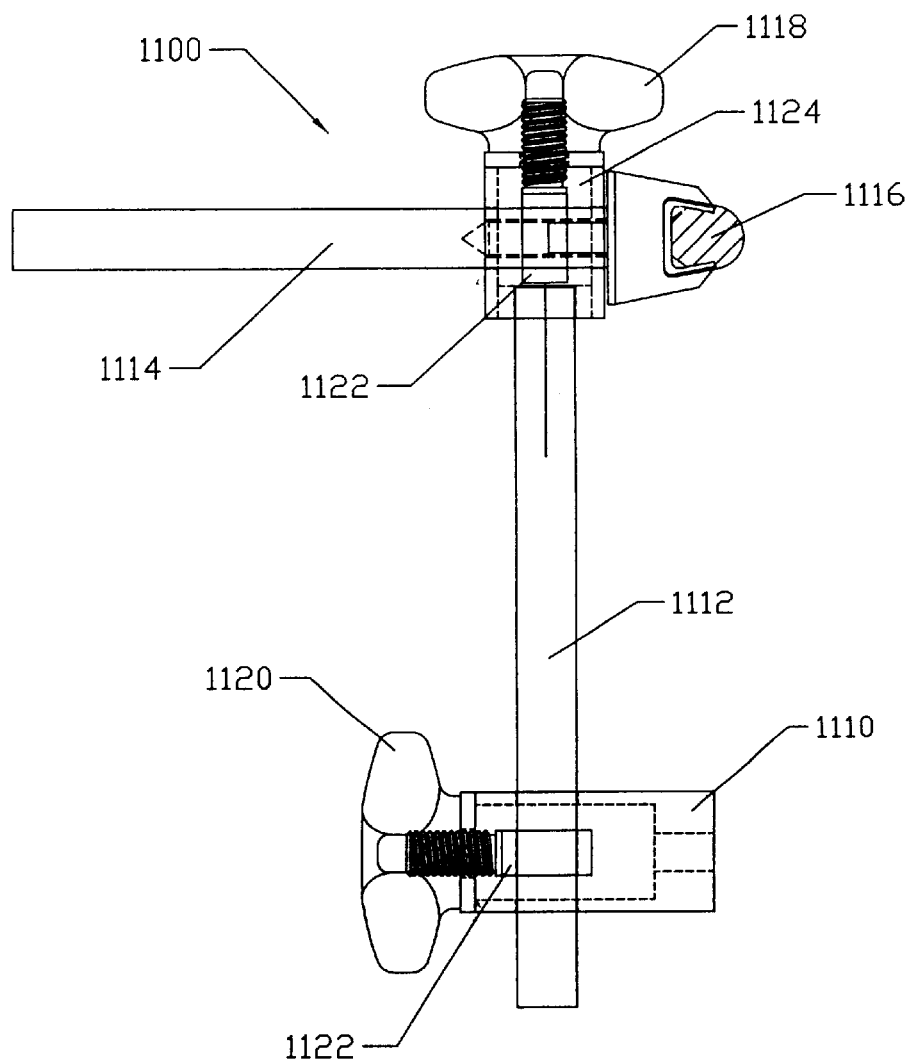
FIG. 11 is an elevation view of another preferred guide support 1100 that includes a base 1110, a body 1112 and a support arm 1114.

Preferably, base 1010, body 1012 and arm 1014 are constructed of stainless steel. Preferably, a guide assembly is provided along both sides of the conveyor belt. This keeps products within a prescribed path along the conveyor Turning to FIG. 11, another preferred guide assembly will be described. Guide assembly 1100 includes a base 1110 that connects to a body 1112 and connects to an arm 1114. Base 1110 defines a hollow shaft that is configured to pass a bolt. This allows for convenient connection to a support arm 104 or to an accessory bracket 1008. That is, the bolt 124, which is used in a support arm assembly, may be passed through base 1110 and secured to the support arm; or the bolt 1011, which is shown in FIG. 10, may be passed through base 1110 and secured to the accessory bracket.

Base 1110 is aligned along a substantially horizontal plane and also defines a vertical passage through which body 1112 passes. This vertical passage extends through a bolt 1122 having a ring or hoop head. Bolt 1122 is further described below with reference to FIG. 12. Knob 1120 includes a threaded engagement with bolt 1122. As knob 1120 is tightened against base 1110, it draws an interior surface of bolt 1122 against body 1112 to secure it in place. Knob 1120 may also be loosened to readjust the vertical position of body 1112. This height is adjusted in accordance with the product(s) that will be carried along the conveyor assembly.

The top of body 1112 also includes a threaded knob 1118 that is used to secure arm 1114. Knob 1118 may be loosened to allow horizontal adjustment of arm 1114. Arm 1114 connects with guide 1116, which runs along the length of the conveyor.

Preferably, base 1110, body 1112 and arm 1114 are constructed of stainless steel. Preferably, a guide assembly is provided along both sides of the conveyor belt. This keeps products within a prescribed path along the conveyor.

Figure 12:
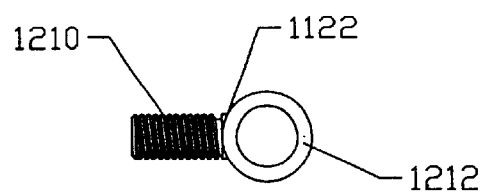
FIG. 12 is an elevation view of bolt 1122 of FIG. 11.

Turning to FIG. 12, bolt 1122 includes a ring head 1212 and a threaded body 1210. Body 1122 passes through ring head 1212, and knob 1120 engages the threaded body. Again, as the knob is tightened against base 1110, the ring head 1212 presses body 1112 (or arm 1114) against base 1110 (or bracket 1124) to form a rigid friction fit.

Figure 13B:
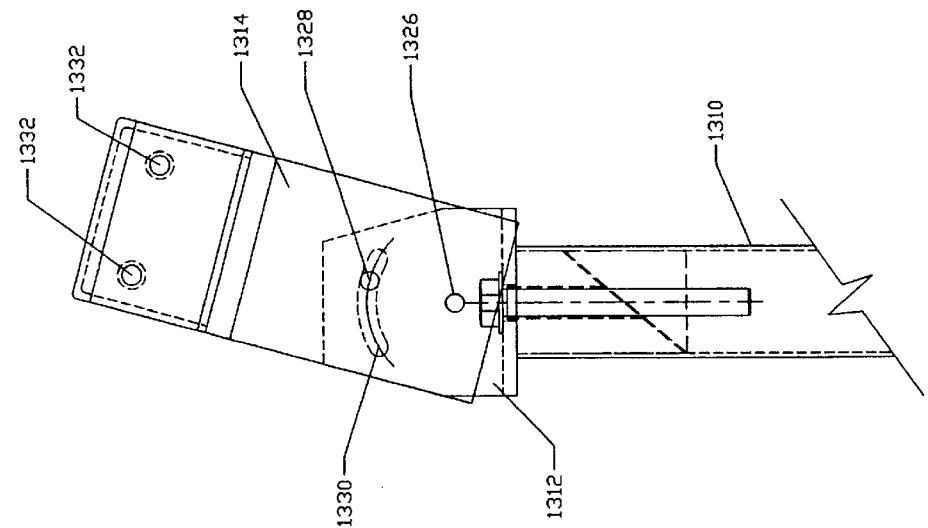
FIG. 13B is an elevation view of a portion of the leg attachment mechanism 1300 shown from a side view.
Figure 13A:
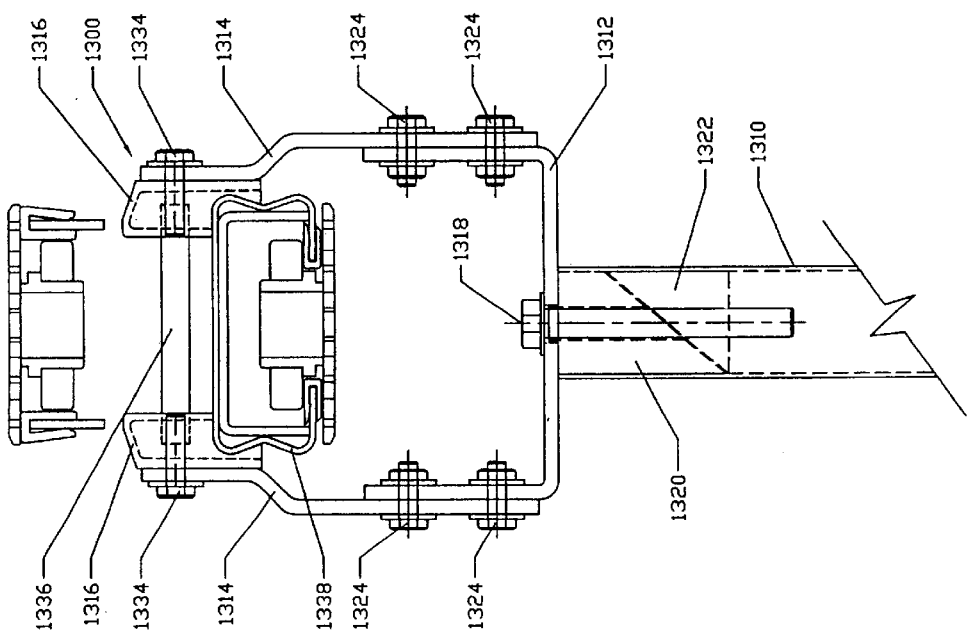
FIG. 13A is an elevation view of a portion of a leg attachment mechanism 1300 shown from an end view.

Turning to FIGS. 13A and 13B, one preferred leg attachment mechanism 1300 will be described in further detail. The attachment mechanism 1300 includes a leg 1310, a base 1312, a pair of side arms 1314, and a pair of leg brackets 1316. Base 1312 connects to leg 1310 using a mechanism that is commonly used to attach the handlebars of a bicycle to the front wheel forks. Specifically, base 1312 defines a hole through which the body of a bolt 1318 is passed. The bolt 1318 passes through a hollow cylinder 1320. The hollow cylinder 1320 has an inclined lower face. Bolt 1318 engages a threaded cylinder 1322. The threaded cylinder 1322 has an inclined upper face that presses against the inclined lower face of hollow cylinder 1320. As bolt 1318 is tightened against base 1312, it draws threaded cylinder 1322 against hollow cylinder 1320. The inclined faces, in turn, force the cylinders 1320 and 1322 to move in opposing directions against an interior surface of leg 1310. This operates to form a rigid friction fit between base 1312 and leg 1310.

Each side arm 1314 attaches to base 1312 using a pair of bolts 1324. Side arm 1314 defines a lower hole 1326 and an upper hole 1328. Likewise, base 1312 defines a lower hole that aligns with lower hole 1326. Base 1312 also defines a slot 1330 that follows an arch centered about the lower hole. A bolt 1324 is passed through the lower holes in the side arm 1314 and base 1312. Another bolt is passed through the upper hole in side arm 1314 and the slot 1330. This configuration allows side arm to be adjusted to various angles. For example, when used in conjunction with an inclined conveyor belt, the side arms would be tilted so that they meet the associated conveyor beam at an approximately right angle.

The upper portion of side arm 1314 defines a pair of holes 1332. These holes align with holes in leg bracket 1316. Leg bracket 1316 is constructed in a manner similar to that of support arms 104, except that they do not include blade guides 410 and 412 nor compression pins 120. In other words, leg bracket is constructed so that its lower portion substantially matches the profile of a conveyor beam. Bolts 1334 are passed through the holes in side arm 1314 and leg bracket 1316. Bolts 1334, in turn, engage coupling nut 1336. As the bolts 1334 are tightened, leg brackets 1316 are drawn against the sides of conveyor beam 1338. This forms a rigid friction fit between the conveyor beam 1338 and leg 1310.

In many applications, a manufacturing process will require a primary assembly line and a second line that is used to divert products. In these circumstances, a second conveyor belt may be operated adjacent to and parallel with the primary conveyor belt. A simple gate is used to divert products from the primary conveyor belt to the second conveyor belt. The primary and secondary conveyor belts may be attached to each other so that they remain a fixed distance apart.

Figure 14:
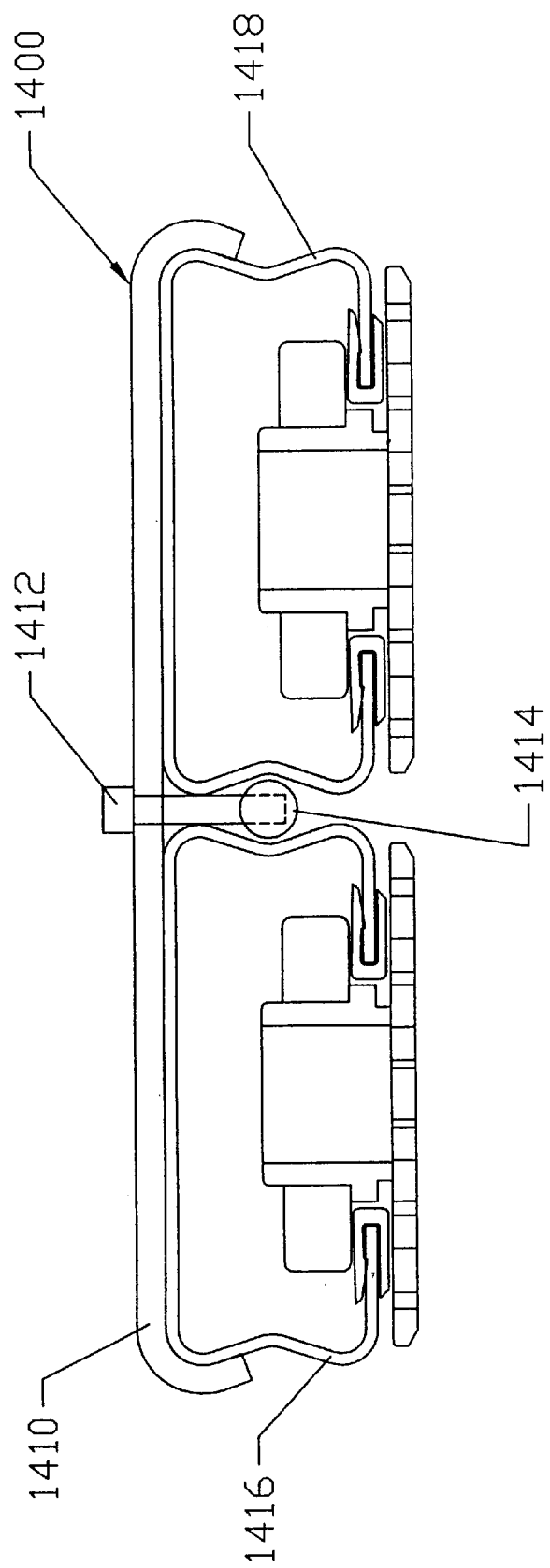
FIG. 14 is an elevation view of side-by-side connector 1400.

Turning to FIG. 14, one preferred conveyor beam attachment bracket 1400 will be described. The attachment bracket 1400 is used to connect two conveyor beams in parallel. The attachment bracket 1400 includes a plate 1410, a bolt 1412 and a separation rod 1414. Plate 1410 spans across two conveyor beams 1416 and 1418. The outer portion of plate 1410 curves around conveyor beams 1416 and 1418, to engage their exterior walls. Rod 1414 is aligned substantially parallel with conveyor beams 1416 and 1418. Rod 1414 also defines a threaded hole. Bolt 1412 passes through a hole that is centered in plate 1410 to engage the threaded hole in rod 1414. As bolt 1412 is tightened against plate 1410, it draws rod 1414 against the interior walls of conveyor beams 1416 and 1418. This, in turn, presses the exterior walls of conveyor beams 1416 and 1418 against the outer portions of plate 1410. As the bolt 1412 is further tightened, the conveyor beams form a rigid friction fit with attachment bracket 1400. Two or more such attachment brackets may be used along a pair of conveyor beams to maintain a fixed parallel pathway as between the pair of conveyor beams.

Figure 15C:
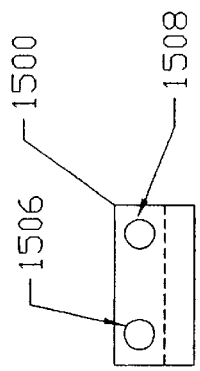
FIG. 15C is an elevation view of side 1520 of attachment block 1500.
Figure 15A:
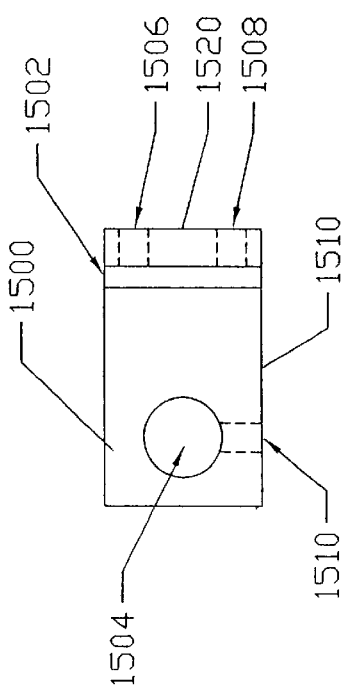
FIG. 15A is a plan view of an attachment block 1500 having sides 1510 and 1520.
Figure 15B:
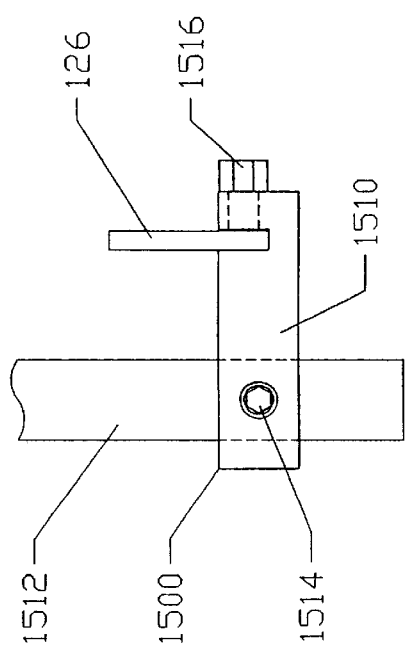
FIG. 15B is an elevation view of side 1510 of attachment block 1500.

Turning to FIGS. 15A–15C, one preferred attachment block 1500 will be described. FIG. 15A shows a plan view of attachment block 1500 having sides 1510 and 1520. FIG. 15B shows an elevation view of side 1510 as well as support blade 126 and accessory 1512 (cut away view), and bolt 1514. FIG. 15C shows an elevation view of side 1520.

Attachment block 1500 defines a slot 1502 and hole 1504. Slot 1502 is configured to engage support blade 126. Attachment block 1500 further defines two threaded holes 1506 and 1508 that meet slot 1502. Slot 1502 is positioned under support blade 126 so that support blade 126 substantially fills slot 1502. Bolts 1516 are turned through threaded holes 1506 and 1508. The end of bolts 1516 press against blade 126 to form a rigid friction fit.

Hole 1504 is configured to receive the support arm of an accessory 1512. Attachment block further defines a threaded hole 1510 that meets hole 1504. Accessory 1512 passes through hole 1504. A bolt 1514 is then turned through threaded hole 1510. The end of bolt 1514 presses against accessory 1512 to form a rigid friction fit.

Although the invention has been described with reference to specific preferred embodiments, those skilled in the art will appreciate that many variations and modifications may be made without departing from the scope of the invention. Likewise, where certain components have been described using particular materials or construction techniques, those skilled in the art will appreciate that other materials and/or construction techniques may be used without departing from the scope of the invention. The following claims are intended to cover all such variations and modifications.

We claim:

1. A conveyor housing especially suited for supporting a conveyor belt having a plurality of interlocking plastic segments comprising:

a first conveyor beam having an upper face, an exterior right side wall connected along a right side of the upper face, and an exterior left side wall connected along a left side of the upper face, wherein the upper face, the right side wall and the left side wall of the first conveyor define a first interior channel;

a second conveyor beam having an upper face, an exterior right side wall connected along a right side of the upper face, and an exterior left side wall connected along a left side of the upper face, wherein the upper face, the right side wall and the left side wall of the second conveyor define a second interior channel, and wherein a profile of the first conveyor beam matches a profile of the second conveyor beam;

a connector having an upper face, a right side wall connected along a right side of the upper face and a left side wall connected along a left side of the upper face and wherein a first portion of the upper face, the right side wall and the left side wall comprise a first end of the connector; and a second portion of the upper face, the right side wall and the left side wall comprise a second end of the connector; and wherein the first end of the connector fits within the first interior channel, and the second end of the connector fits within the second interior channel to form a friction fit between the first and second conveyor beams; and a plurality of arms arranged intermittently along the first and the second conveyor beams and extending vertically upward to support a top portion of the conveyor belt having the plurality of interlocking plastic segments.

2. A conveyor housing especially suited for supporting a conveyor belt having a plurality of interlocking plastic segments comprising:

a first conveyor beam having an upper face, an exterior right side wall connected along a right side of the upper face, and an exterior left side wall connected along a left side of the upper face, wherein the upper face, the right side wall and the left side wall of the first conveyor define a first interior channel;

a second conveyor beam having an upper face, an exterior right side wall connected along a right side of the upper face, and an exterior left side wall connected along a left side of the upper face, wherein the upper face, the right side wall and the left side wall of the second conveyor define a second interior channel, and wherein a profile of the first conveyor beam matches a profile of the second conveyor beam; and a connector having an upper face, a right side wall connected along a right side of the upper face and a left side wall connected along a left side of the upper face and wherein a first portion of the upper face, the right side wall and the left side wall comprise a first end of the connector; and a second portion of the upper face, the right side wall and the left side wall comprise a second end of the connector; and wherein the first end of the connector fits within the first interior channel, and the second end of the connector fits within the second interior channel to form a friction fit between the first and second conveyor beams; and wherein the right and left side walls of the first and second conveyor beams each comprise a first and a second inclined surface, wherein each of the respective first inclined surfaces meet the respective upper face at an acute angle.

3. The conveyor housing of claim 2, wherein the conveyor housing further comprises a conveyor belt having a plurality of interlocking plastic segments and wherein the first and second conveyor beams each further comprise a lower face having a right side that connects with the right side wall and a left side that connects with the left side wall and wherein the lower face defines a slot between the right side and the left side configured to receive and support a lower portion of the conveyor belt.

4. The conveyor housing of claim 3, wherein the first and second conveyor beams are each constructed from a single sheet of malleable metal.

5. The conveyor housing of claim 4, further comprising a first cap constructed of a low-friction material that covers a substantial portion of the right side of the lower face and a second cap also constructed of a low-friction material that covers a substantial portion of the left side of the lower face.

6. The conveyor housing of claim 1, wherein the first end of the connector defines at least one threaded hole, configured to receive a threaded rod that engages the first conveyor beam to form the friction fit with the first conveyor beam, and the second end of the conveyor defines at least one threaded hole configured to receive a threaded rod that engages the second conveyor beam to form the friction fit with the second conveyor beam.

7. The conveyor housing of claim 1, further comprising:
 a right support arm secured along the right side wall of the first conveyor beam;
 a left support arm secured along the left side wall of the first conveyor beam adjacent to the right support arm;
 a connecting member positioned substantially between the right support arm and the left support arm and extending from the right support arm to the left support arm, wherein the connecting member induces the right support arm and the left support arm to maintain a friction fit on the conveyor.

8. A conveyor housing especially suited for supporting a conveyor belt having a plurality of interlocking plastic segments comprising:
 a first conveyor beam having an upper face, an exterior right side wall connected along a right side of the upper face, and an exterior left side wall connected along a left side of the upper face, wherein the upper face, the right side wall and the left side wall of the first conveyor define a first interior channel;
 second conveyor beam having an upper face, an exterior right side wall connected along a right side of the upper face, and an exterior left side wall connected along a left side of the upper face, wherein the upper face, the right side wall and the left side wall of the second conveyor define a second interior channel, and wherein a profile of the first conveyor beam matches a profile of the second conveyor beam;
 a connector having an upper face, a right side wall connected along a right side of the upper face and a left side wall connected along a left side of the upper face and wherein a first portion of the upper face, the right side wall and the left side wall comprise a first end of the connector; and a second portion of the upper face, the right side wall and the left side wall comprise a second end of the connector; and wherein the first end of the connector fits within the first interior channel, and the second end of the connector fits within the second interior channel to form a friction fit between the first and second conveyor beams;
 a right support arm secured along the right side wall of the first conveyor beam;
 a left support arm secured along the left side wall of the first conveyor beam adjacent to the right support arm, wherein a lower portion of the right support arm and a lower portion of the left support arm match a profile of the right and left side walls of the conveyor beam, respectively; and
 a connecting member positioned substantially between the right support arm and the left support arm, wherein the connecting member maintains a friction fit on the conveyor.

9. A conveyor housing especially suited for supporting a conveyor belt having a plurality of interlocking plastic segments comprising:
 a first conveyor beam having an upper face, an exterior right side wall connected along a right side of the upper face, and an exterior left side wall connected along a left side of the upper face, wherein the upper face, the right side wall and the left side wall of the first conveyor define a first interior channel;
 second conveyor beam having an upper face, an exterior right side wall connected along a right side of the upper face, and an exterior left side wall connected along a left side of the upper face, wherein the upper face, the right side wall and the left side wall of the second conveyor define a second interior channel, and wherein a profile of the first conveyor beam matches a profile of the second conveyor beam;
 a connector having an upper face, a right side wall connected along a right side of the upper face and a left side wall connected along a left side of the upper face and wherein a first portion of the upper face, the right side wall and the left side wall comprise a first end of the connector; and a second portion of the upper face, the right side wall and the left side wall comprise a second end of the connector; and wherein the first end of the connector fits within the first interior channel, and the second end of the connector fits within the second interior channel to form a friction fit between the first and second conveyor beams;
 a right support arm secured along the right side wall of the first conveyor beam;
 a left support arm secured along the left side wall of the first conveyor beam adjacent to the right support arm, wherein a lower portion of the right support arm and a lower portion of the left support arm match a profile of the right and left side walls of the conveyor beam, respectively;

a tension member positioned substantially between the right support arm and the left support arm, wherein the tension member pulls the right and left support arms together; and a compression member positioned substantially between the right support arm and the left support arm, wherein the compression member maintains a fixed distance between the right and left support arms.

10. The conveyor housing of claim 9, wherein an upper surface of the right support arm defines a right slot and an upper surface of the left support arm defines a left slot, and wherein the conveyor housing further comprises a right blade positioned along a substantially vertical plane in the right slot, and a left blade positioned along a substantially vertical plane, parallel to the right blade, in the left slot, and wherein the right and left blades are configured to support an upper portion of a conveyor belt having a plurality of interlocking plastic segments.

11. The conveyor housing of claim 10, further comprising of an attachment block with at least one threaded hole, configured to receive a threaded rod that engages one of the blades to form a friction fit.

12. The conveyor housing of claim 10, further comprising:

a right plastic cap covering an upper surface of the right blade; and a left plastic cap covering an upper surface of the left blade, and wherein the right and left plastic caps are configured to act as a wear-strip between the right and left blades and the conveyor belt.

13. The conveyor housing of claim 12, further comprising a wheel bend, wherein the wheel bend includes:

an upper and a lower wheel configured to support the upper and a lower portion of a conveyor belt, respectively;

an axel connected to the center of the upper and the lower wheel; and a curved vertical support beam coupled with the axel and having a radius of curvature centered about the axel, wherein the radius of curvature is greater than the radius of the upper and the lower wheel.

14. The conveyor housing of claim 13, further comprising a leg support arm, wherein the leg support arm includes:

a right and a left arm positioned on opposite sides of the first conveyor beam; and a tension member operationally coupled with the right and left arm and configured to draw the right and left arm against the first conveyor beam to form a rigid friction fit.

15. A conveyor belt assembly comprising:

a conveyor beam having an upper face aligned along a substantially horizontal plane, a first and a second side wall fixedly attached directly to the upper face along opposite sides of the upper face, and a lower face fixedly attached directly to the first and the second side walls, wherein a portion of the first and second side walls are inclined at an acute angle with respect to the upper face, wherein another portion of the first and second side walls are inclined at an obtuse angle with respect to the upper face, and wherein the lower face defines a slot configured to engage a conveyor belt;

a connector forming a friction fit with the conveyor beam; and a conveyor belt having a plurality of individual segments each of which is pivotally attached to two adjacent individual segments, and wherein the conveyor belt engages the slot.

16. The conveyor belt assembly of claim 15, wherein the conveyor beam is constructed from a single sheet of malleable metal.

17. The conveyor belt assembly of claim 16, wherein the connector comprises an upper face, a first and a second side wall, and at least one threaded rod configured to form a friction fit within the conveyor beam.

18. The conveyor belt assembly of claim 17, wherein the conveyor belt is constructed of plastic.

19. The conveyor belt assembly of claim 15, further comprising:

a first and a second vertical arm wherein the first vertical arm mounts against the first side wall of the conveyor beam and the second vertical arm mounts against the second side wall of the conveyor beam; and a first and a second support blade each aligned along a substantially vertical plane wherein the first support blade rests upon the first vertical arm and the second support blade rests upon the second vertical arm, and wherein a portion of the conveyor belt rests upon the first and second support blades.

20. The conveyor belt assembly of claim 19, wherein the first and second support blades are configured to support the portion of the conveyor belt without engaging the portion of the conveyor belt so that a substantial portion of the conveyor belt can be lifted from the first and second support blades while the conveyor belt remains assembled as a continuous loop.

21. A conveyor belt assembly comprising:

a conveyor beam having an upper face aligned along a substantially horizontal plane, a first and a second side wall fixedly attached directly to the upper face along opposite sides of the upper face, and a lower face fixedly attached directly to the first and the second side walls, wherein the lower face defines a slot configured to engage a conveyor belt;

a connector forming a friction fit with the conveyor beam;

a conveyor belt having a plurality of individual segments each of which is pivotally attached to two adjacent individual segments, and wherein the conveyor belt engages the slot;

a first and a second vertical arm wherein the first vertical arm mounts against the first side wall of the conveyor beam and the second vertical arm mounts against the second side wall of the conveyor beam;

a first and a second support blade each aligned along a substantially vertical plane wherein the first support blade rests upon the first vertical arm and the second support blade rests upon the second vertical arm, and wherein a portion of the conveyor belt rests upon the first and second support blades;

a coupling nut having a first and a second end each threaded to receive a bolt;

a first bolt mounted through a middle portion of the first vertical arm and turned into the first end of the coupling nut;

a second bolt mounted through a middle portion of the second vertical arm land turned into the second end of the coupling nut; and a pin pressed between an upper end of the first vertical arm and an upper end of the second vertical arm and wherein a lower end of the first vertical arm presses against the first side wall of the conveyor beam and a lower end of the second vertical arm presses against the second side wall of the conveyor beam to form a friction fit.

22. The conveyor belt assembly of claim 21, further comprising a first and a second plastic cap wherein the first plastic cap covers an uppermost surface of the first support blade and the second plastic cap covers an uppermost surface of the second support blade, so that the portion of the conveyor belt rests upon the first and second plastic caps.

23. The conveyor belt assembly of claim 15, wherein the connector comprises an upper face and a first and a second side wall attached along opposite sides of the upper face of the connector, wherein the first and second side walls of the connector press against the lower face of the conveyor beam to form a rigid friction fit.

24. The conveyor belt assembly of claim 23, further comprising a plurality of screws each turned though a threaded hole in the connector, wherein each of the plurality of screws presses against the conveyor beam to form the friction fit.

25. A conveyor belt support assembly especially suitable for use in conjunction with a plastic conveyor belt having a plurality of interlocking segments comprising:
   a first channel having an upper surface and a first and a second exterior wall connected along opposite sides of the upper surface;
   a second channel operationally coupled with the first channel and having an upper surface and a first and a second exterior wall connected along opposite sides of the upper surface;
   a plurality of first vertical supports positioned intermittently along the first side of the first channel;
   a plurality of second vertical supports positioned intermittently along the second side of the first channel each proximate to one of the first vertical supports;
   a connecting member positioned substantially between the first vertical support and the second vertical support, wherein the connecting member maintains a friction fit between the first and second vertical supports and the first channel.

26. A conveyor belt support assembly especially suitable for use in conjunction with a plastic conveyor belt having a plurality of interlocking segments comprising:
   a first channel having an upper surface and a first and a second exterior wall connected along opposite sides of the upper surface;
   a second channel operationally coupled with the first channel and having an upper surface and a first and a second exterior wall connected along opposite sides of the upper surface;
   a first vertical support positioned along the first side of the first channel;
   a second vertical support positioned along the second side of the first channel proximate the first vertical support;
   a connecting member positioned substantially between the first vertical support and the second vertical support, wherein the connecting member comprises:
      a compression member having a first end positioned against the first vertical support and a second end positioned against the second vertical support; and
      a tension member having a first end connected along the first vertical support between the compression member and the first wall of the first channel, and having a second end connected along the second vertical support between the compression member and the second wall of the first channel, and wherein the connecting member maintains a friction fit between the first and second vertical supports and the first channel.

27. A conveyor belt support assembly especially suitable for use in conjunction with a plastic conveyor belt having a plurality of interlocking segments comprising:
   a first channel having an upper surface and a first and a second exterior wall connected along opposite sides of the upper surface;
   a second channel operationally coupled with the first channel and having an upper surface and a first and a second exterior wall connected along opposite sides of the upper surface, wherein the first wall of the first and second channels each define a first inclined plane that meets the respective upper surface at a first acute angle, and wherein the second wall of the first and second channels each define a second inclined plane that meets the respective upper surface at a second acute angle;
   a first vertical support positioned along the first side of the first channel;
   a second vertical support positioned along the second side of the first channel proximate the first vertical support; and
   a connecting member positioned substantially between the right support arm and the left support arm, wherein the connecting member maintains a friction fit between the first and second vertical supports and the first channel.

28. The conveyor belt support assembly of claim 27, wherein the first wall of the first and second channels each further define a third inclined plane that meets the respective first inclined plane at a first obtuse angle, and wherein the second wall of the first and second channels each define a fourth inclined plane that meets the respective second inclined plane at a second obtuse angle.

29. The conveyor belt support assembly of claim 28, further comprising a bend connector positioned between the first and second channels, wherein the bend connector comprises:
   a curved support surface having a first and a second end, wherein the first end terminates proximate the first channel and the second end terminates proximate the second channel;
   a first connector end having an upper surface and a first and a second inclined wall connected along opposite sides of the upper surface and configured to fit within the first channel; and
   a second connector end having an upper surface and a first and a second inclined wall connected along opposite sides of the upper surface and configured to form a friction fit within the second channel.

30. The conveyor belt support assembly of claim 28, further comprising a straight connector positioned between the first and second channels, wherein the straight connector comprises:
   a first connection having an upper surface and a first and a second wall connected along opposite sides of the upper surface and configured to fit within the first channel to form a friction fit therewith; and
   a second connection having an upper surface and a first and a second wall connected along opposite sides of the upper surface and configured to fit within the second channel to form a friction fit therewith.

31. A conveyor belt support assembly especially suitable for use in conjunction with a plastic conveyor belt having a plurality of interlocking segments comprising:

a first channel having an upper surface and a first and a second exterior wall connected along opposite sides of the upper surface;

a second channel operationally coupled with the first channel and having an upper surface and a first and a second exterior wall connected along opposite sides of the upper surface;

a first vertical support positioned along the first side of the first channel, wherein the first vertical support comprises an interior wall, an exterior wall, a first side wall connecting the interior wall to the exterior wall along a first side, and a second side wall connecting the interior wall to the exterior wall along a second side, and wherein a profile of a lower portion of the first and second side walls matches a profile of an upper portion of the first wall of the first channel;

a second vertical support positioned along the second side of the first channel proximate the first vertical support, wherein the second vertical support comprises an interior wall, an exterior wall, a first side wall connecting the interior wall to the exterior wall along a first side, and a second side wall connecting the interior wall to the exterior wall along a second side, and wherein a profile of a lower portion of the first and second side walls matches a profile of an upper portion of the second wall of the first channel; and a connecting member positioned substantially between the first vertical support and the second vertical support, wherein the connecting member maintains a friction fit between the first and second vertical supports and the first channel.

32. The conveyor belt support assembly of claim 31, wherein the compression member comprises a pin having a first end and a second end, wherein the first end rests on the interior wall of the first vertical support to secure the first end of the compression member and the second end rests on the interior wall of the second vertical support to secure the second end of the compression member.

33. The conveyor belt support assembly of claim 31, wherein the tension member comprises a coupling nut, a first bolt that forms a first end of the tension member and a second bolt that forms a second end of the tension member, and wherein a body of the first bolt passes through a hole defined by the first vertical support and engages a first end of the coupling nut, and wherein a body of the second bolt passes through a hole defined by the second vertical support and engages a second end of the coupling nut.

34. The conveyor belt support assembly of claim 31 wherein the compression member comprises a pin and wherein the first end passes through a first hole defined by the interior wall of the first vertical support and extends to the exterior wall of the first vertical support to secure the first end of the compression member and wherein the second end passes through a second hole defined by the interior wall of the second vertical support and extends to the exterior wall of the second vertical support to secure the second end of the compression member.

35. The conveyor belt support assembly of claim 34, wherein the tension member comprises a threaded rod, a first bolt that forms the first end of the tension member and a second bolt that forms the second end of the tension member, and wherein a body of the first bolt passes through a third hole defined by the exterior wall of the first vertical support and engages a first end of the threaded rod, and wherein a body of the second bolt passes through a fourth hole defined by the exterior wall of the second vertical support and engages a second end of the threaded rod.

36. The conveyor belt support assembly of claim 35, wherein the first channel and the second channel are each constructed from a single sheet of stainless steel and wherein the upper surface, and the first and second walls connect along a bend in the single sheet of stainless steel.

37. The conveyor belt support assembly of claim 36, wherein the first vertical support, the second vertical support, the compression member, and the tension member are each constructed of stainless steel.

38. A conveyor assembly comprising:

a first conveyor beam having an upper face, an exterior right side wall connected along a right side of the upper face, and an exterior left side wall connected along a left side of the upper face, wherein the upper face, the right side wall and the left side wall of the first conveyor define a first interior channel;

a second conveyor beam having an upper face, an exterior right side wall connected along a right side of the upper face, and an exterior left side wall connected along a left side of the upper face, wherein the upper face, the right side wall and the left side wall of the second conveyor define a second interior channel, and wherein a profile of the first conveyor beam matches a profile of the second conveyor beam;

a connector having an upper face, a right side wall connected along a right side of the upper face and a left side wall connected along a left side of the upper face and wherein a first portion of the upper face, the right side wall and the left side wall comprise a first end of the connector; and a second portion of the upper face, the right side wall and the left side wall comprise a second end of the connector; and wherein the first end of the connector fits within the first interior channel, and the second end of the connector fits within the second interior channel to form a friction fit between the first and second conveyor beams;

a plurality of arms arranged along the first and second conveyor beams wherein each of the arms have an upper portion and a lower portion, wherein the lower portion engages one of the conveyor beams to form a friction fit therewith;

a right-side and a left-side bar that run parallel to the first and second conveyor beams and are supported by the upper portion of the plurality of arms; and a conveyor belt having an upper and a lower portion, wherein the upper portion of the conveyor belt is supported by the right-side bar and the left-side bar, and wherein the upper portion of the conveyor belt and the upper face of the conveyor beam define an open space that is accessible from either side of the conveyor housing.

39. The conveyor assembly of claim 38, wherein the first and second conveyor beams each further comprise a lower face having a right side that connects along the right side wall and a left side that connects along the left side wall, and wherein the lower face is configured to support the lower portion of the conveyor belt.

40. The conveyor assembly of claim 39, wherein the lower face defines a slot that runs parallel to the length of the respective conveyor beam, and wherein the slot is configured to receive and support the lower portion of the conveyor belt.

41. The conveyor assembly of claim 38, wherein the conveyor belt comprises a plurality of interlocking plastic segments.

42. The conveyor assembly of claim 38, further comprising a right plastic cap covering the right-side bar and a left plastic cap covering the left-side bar, and wherein the left and right plastic caps are configured to act as a wear strip between the right-side and left-side bars and the conveyor belt.

43. The conveyor assembly of claim 40, further comprising a beam attachment bracket configured to attach two conveyor beams in parallel.

44. The conveyor housing of claim 1, further comprising:
a conveyor belt having a plurality of individual segments each of which is pivotally attached to two adjacent individual segments, and wherein the conveyor belt engages the first interior channel of the first conveyor beam and the second interior channel of the second conveyor beam.

45. The conveyor housing of claim 25, further comprising:
a conveyor belt having a plurality of individual segments each of which is pivotally attached to two adjacent individual segments, and wherein the conveyor belt engages the first channel between the first and second exterior walls of the first channel, and wherein the conveyor belt engages the second channel between the first and second exterior walls of the second channel.

46. A conveyor housing especially suited for supporting a conveyor belt having a plurality of interlocking plastic segments comprising:
a first conveyor beam having an upper face, an exterior right side wall connected along a right side of the upper face, and an exterior left side wall connected along a left side of the upper face, wherein the upper face, the right side wall and the left side wall of the first conveyor define a first interior channel, and wherein a portion of the exterior right side wall and a portion of the exterior left side wall each incline inward at an acute angle with respect to the upper face;
a second conveyor beam having an upper face, an exterior right side wall connected along a right side of the upper face, and an exterior left side wall connected along a left side of the upper face, wherein the upper face, the right side wall and the left side wall of the second conveyor define a second interior channel, and wherein a portion of the exterior right side wall and a portion of the exterior left side wall each incline inward at an acute angle with respect to the upper face; and wherein a profile of the first conveyor beam matches a profile of the second conveyor beam; and a connector having an upper face, a right side wall connected along a right side of the upper face and a left side wall connected along a left side of the upper face and wherein a first portion of the upper face, the right side wall and the left side wall comprise a first end of the connector; and a second portion of the upper face, the right side wall and the left side wall comprise a second end of the connector; and wherein the first end of the connector fits within the first interior channel, and the second end of the connector fits within the second interior channel to form a friction fit between the first and second conveyor beams.

47. A conveyor housing especially suited for supporting a conveyor belt having a plurality of interlocking plastic segments comprising:
a first conveyor beam having an upper face, an exterior right side wall connected along a right side of the upper face, and an exterior left side wall connected along a left side of the upper face, wherein the upper face, the right side wall and the left side wall of the first conveyor define a first interior channel, and wherein a portion of the exterior right side wall and a portion of the exterior left side wall each incline inward at an acute angle with respect to the upper face;
a second conveyor beam having an upper face, an exterior right side wall connected along a right side of the upper face, and an exterior left side wall connected along a left side of the upper face, wherein the upper face, the right side wall and the left side wall of the second conveyor define a second interior channel, and wherein a portion of the exterior right side wall and a portion of the exterior left side wall each incline inward at an acute angle with respect to the upper face; and wherein a profile of the first conveyor beam matches a profile of the second conveyor beam; and
a connector means for forming a friction fit between the first and the second conveyor beams.

48. The conveyor housing of claim 47, wherein the first and the second conveyor beams are each constructed from one or more bent sheets of stainless steel.

49. The conveyor housing of claim 47, wherein the upper face of the first and second conveyor beams are continuous.

* * * * *